United States Patent
Eguchi

(10) Patent No.: US 8,654,456 B2
(45) Date of Patent: Feb. 18, 2014

(54) PHOTOGRAPHIC OPTICAL SYSTEM AND IMAGE PICKUP APPARATUS INCLUDING THE PHOTOGRAPHIC OPTICAL SYSTEM

(75) Inventor: Kaoru Eguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 13/113,607

(22) Filed: May 23, 2011

(65) Prior Publication Data

US 2011/0310486 A1    Dec. 22, 2011

(30) Foreign Application Priority Data

Jun. 16, 2010  (JP) ................................. 2010-137237

(51) Int. Cl.
G02B 13/02   (2006.01)
G02B 9/14    (2006.01)
G02B 3/08    (2006.01)

(52) U.S. Cl.
USPC ............................ 359/748; 359/786; 359/743

(58) Field of Classification Search
USPC ........................................... 359/743, 748, 786
See application file for complete search history.

(56) References Cited

U.S. PATENT DOCUMENTS

| 5,745,306 A | 4/1998 | Sato |
| 5,757,555 A | 5/1998 | Sato |
| 7,426,083 B2 | 9/2008 | Endo |

*Primary Examiner* — Alessandro Amari
(74) *Attorney, Agent, or Firm* — Canon USA Inc. IP Division

(57) ABSTRACT

A photographic optical system includes, in order from an object side to an image side, a first lens unit, a second lens unit for focusing, and a third lens unit. The first lens unit includes a first lens sub-unit having a positive refractive power and a second lens sub-unit. The first lens unit includes a diffractive optical element and an aspheric surface. A length on an optical axis from a lens surface furthest on the object side of the first lens sub-unit to an image plane, an air space between the first lens sub-unit and the second lens sub-unit, a focal length of the first lens sub-unit, a focal length of the second lens sub-unit, a focal length of the diffractive optical element by only a diffractive component, a focal length and an F-number of the entire photographic optical system are appropriately set to satisfy predetermined conditions for optimal focusing.

11 Claims, 15 Drawing Sheets

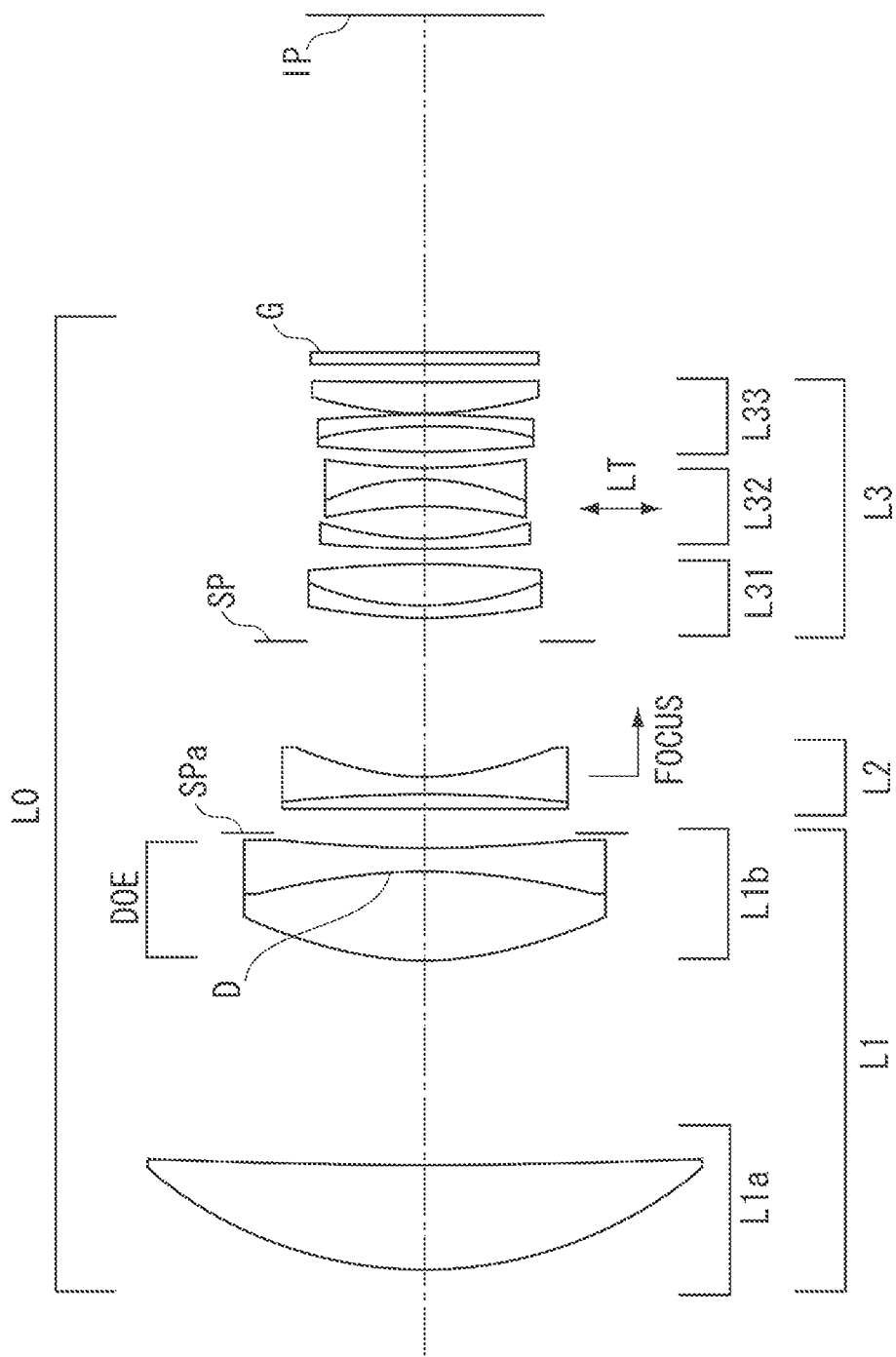

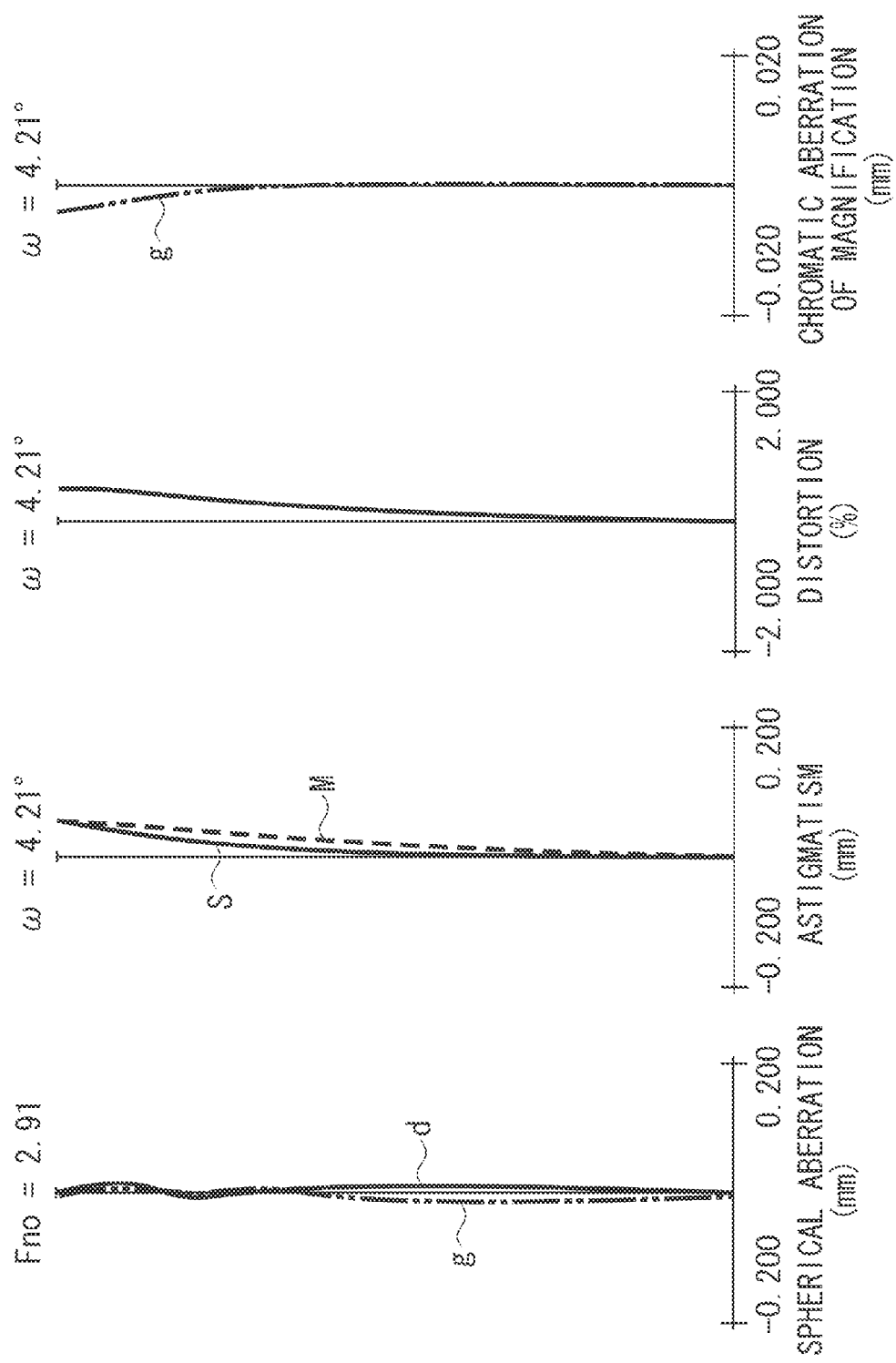

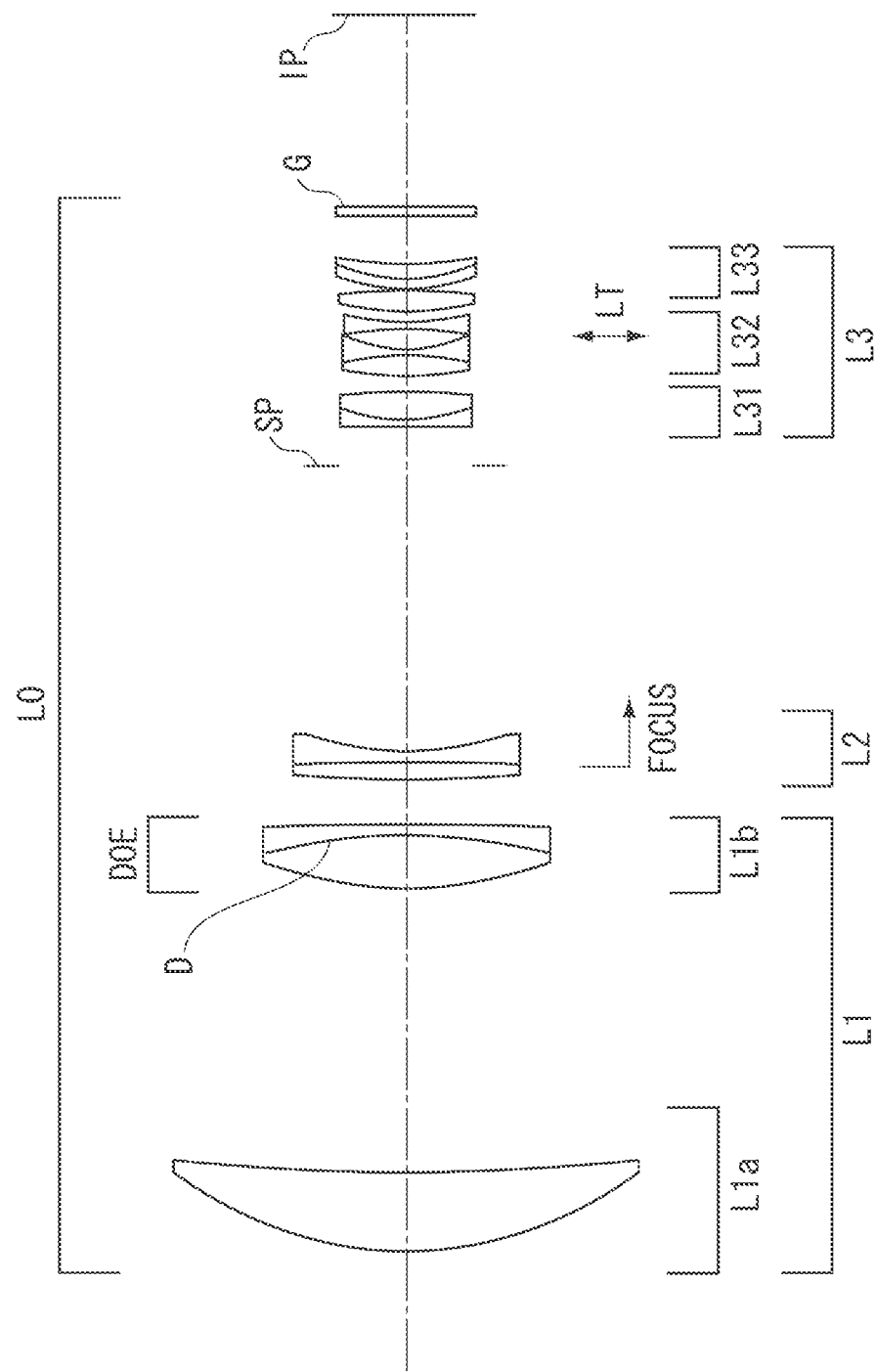

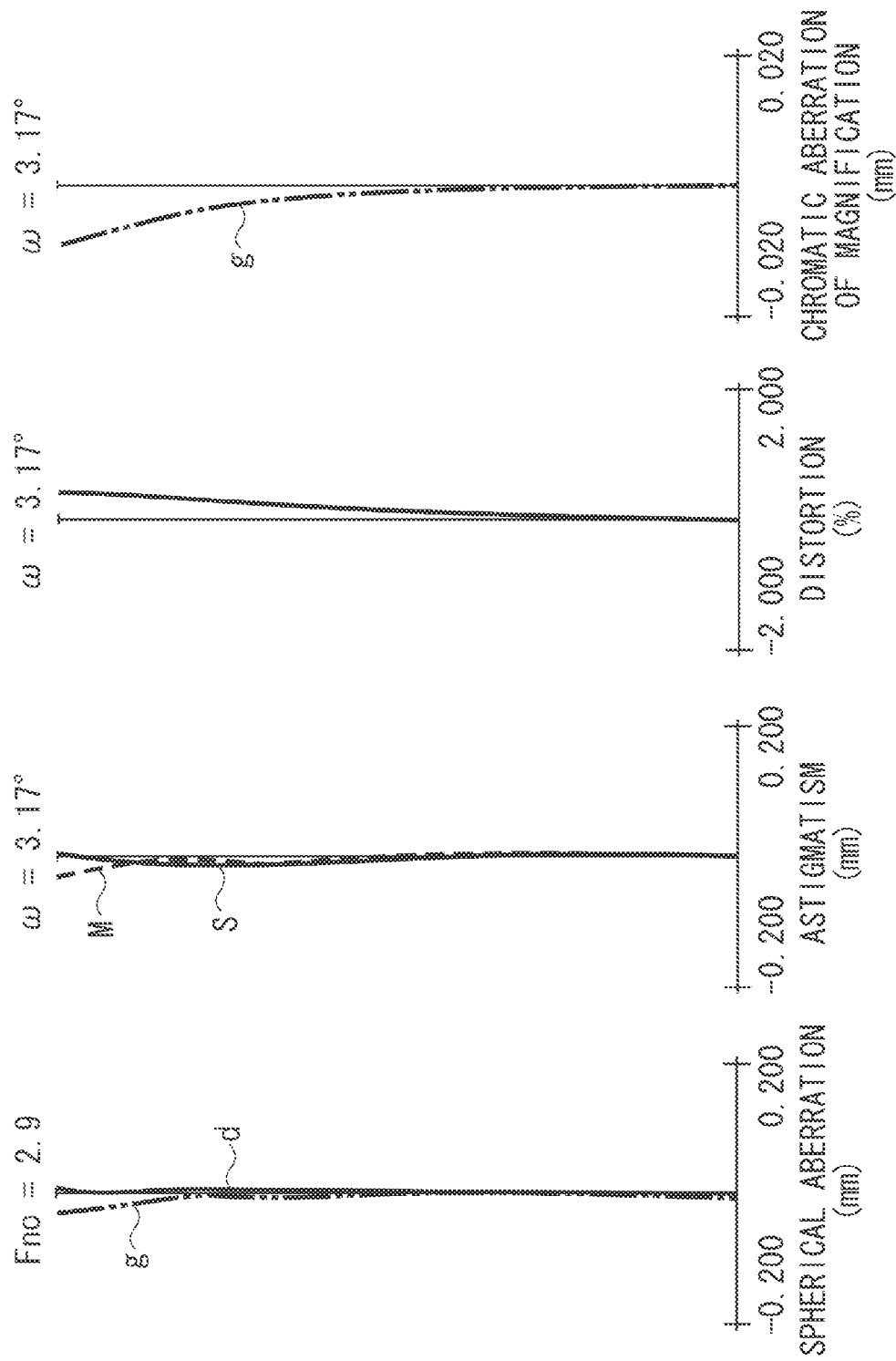

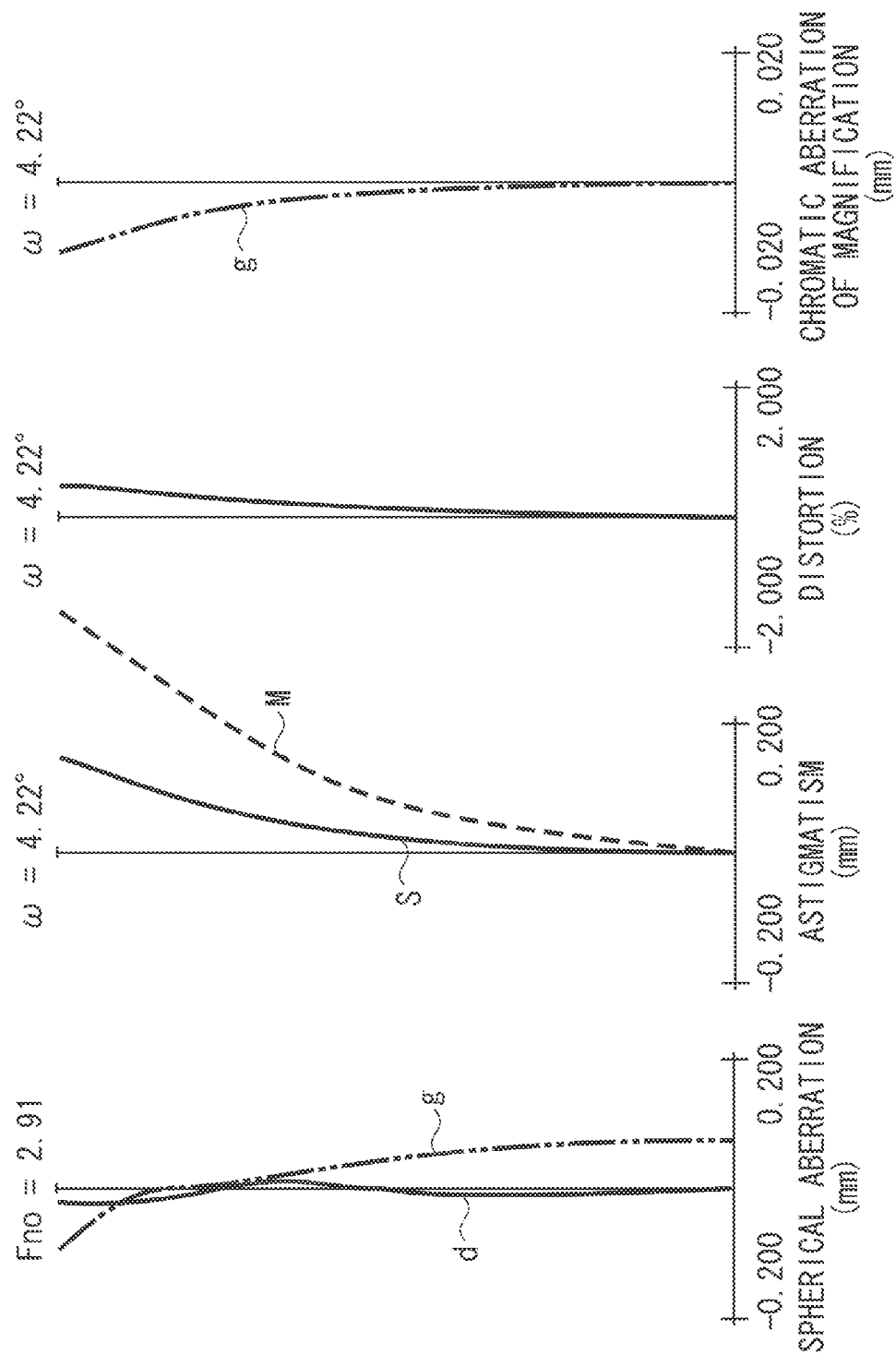

PHOTOGRAPHIC OPTICAL SYSTEM AND IMAGE PICKUP APPARATUS INCLUDING THE PHOTOGRAPHIC OPTICAL SYSTEM

BACKGROUND OF THE INVENTION

1. Field of the Invention

The present invention relates to a photographic optical system and an image pickup apparatus that can use the photographic optical system. More specifically, the present invention relates to a photographic optical system useful in an image pickup apparatus, such as a video camera, a digital still camera, a television (TV) camera, or a monitoring camera, and to an image pickup apparatus including the photographic optical system.

2. Description of the Related Art

A conventional telephoto type photographic optical system having a long focal length includes, in order from the object side to the image side, a front lens unit having a positive refractive power and a rear lens unit having a negative refractive power. Generally, in a photographic lens having a long focal length (telephoto lens), chromatic aberration tends to occur. Specifically, in a telephoto lens, the longer the focal length becomes, the more the amount of chromatic aberration, such as axial chromatic aberration and chromatic aberration of magnification, may occur.

A conventional telephoto lens corrects the above-described chromatic aberration by using a positive lens made of a low dispersion material having anomalous partial dispersion, such as fluorite or FK01 (a product of OHARA INC.) and a negative lens made of a high dispersion material in combination with each other. U.S. Pat. No. 5,757,555 discusses a telephoto lens having a focal length of 294 to 392 mm and an F-number of 4.08 to 5.6.

In addition, a large amount of spherical aberration and coma may occur in a telephoto lens having a small F-number. In order to correct spherical aberration and coma occurring on a telephoto lens having a small F-number, a conventional technique is to increase the flexibility of correcting aberrations by increasing the number of lenses. U.S. Pat. No. 5,745,306 discusses a telephoto lens having a high aperture ratio, whose focal length is 294 to 588 mm and F-number is 2.88 to 4.08, which corrects aberration by using an increased number of lenses.

On the other hand, a conventional photographic optical system uses a diffractive optical element to reduce the total weight of the photographic lens while various aberrations including chromatic aberration that may occur in the optical system are corrected at the same time. By using a diffractive optical element, the weight of a photographic optical system can be reduced while correcting chromatic aberration at the same time by reducing the lens total length and by using a lens made of a glass material whose specific gravity is relatively low.

U.S. Pat. No. 7,426,083 discusses a telephoto lens having a high aperture ratio capable of appropriately correcting chromatic aberration by using a diffractive optical element. More specifically, the telephoto lens discussed in U.S. Pat. No. 7,426,083 has a focal length of 493 to 780 mm and an F-number of 4.1 to 5.8.

The telephoto lens discussed in U.S. Pat. No. 7,426,083 uses an optical system having a short lens total length and uses a positive lens included in a front lens unit made of a glass material whose specific gravity is relatively low. Accordingly, the above-described conventional telephoto lens can reduce the total weight of the optical system while correcting chromatic aberration.

In most conventional photographic optical systems, focusing from an infinitely-distant object to a short-distance object is executed by moving the entire photographic lens system or a part of lens units included in the photographic lens system. The size of a telephoto lens having a long focal length may be large. As a result, the weight of a conventional telephoto lens tends to be rather heavy. Accordingly, if the telephoto lens like this is used, it becomes difficult to execute focusing by moving the entire telephoto lens system.

Therefore, most conventional telephoto lens systems execute focusing by moving a specific lens unit(s) among those included in the telephoto lens system. As one type of the photographic optical systems described above, various inner-focus type photographic optical systems have been used. In an inner-focus type photographic optical system, a relatively small and lightweight lens unit, which is provided at the center of the optical system, is moved during focusing.

Each of telephoto lenses discussed in U.S. Pat. No. 5,757,555, U.S. Pat. No. 5,745,306, and U.S. Pat. No. 7,426,083 includes, in order from the object side to the image side, a first lens unit having a positive refractive power and a second lens unit having a negative refractive power. Furthermore, each of the conventional telephoto lenses described above employs an inner-focus method, by which focusing is executed by moving the second lens unit along the optical axis towards the image side.

In a telephoto lens, generally, the longer the focal length becomes, the greater in size and the heavier in weight a front lens unit having a positive refractive power becomes. Accordingly, in order to achieve a high optical performance by appropriately correcting chromatic aberration while reducing the total size of the photographic optical system, it is significant to appropriately set the lens configuration of the front lens unit having a positive refractive power.

SUMMARY OF THE INVENTION

The present invention is directed to a photographic optical system which is small in size, light in weight, and capable of appropriately correcting various aberrations, such as chromatic aberration, and to an image pickup apparatus having the photographic optical system.

According to an aspect of the present invention, a photographic optical system includes, in order from an object side to an image side and arranged along an optical axis thereof, a first lens unit having a positive refractive power, a second lens unit having a positive or negative refractive power, and a third lens unit having a positive or negative refractive power. The first lens unit consists of a first lens sub-unit having a positive refractive power and a second lens sub-unit having a positive or negative refractive power with a largest air space provided therebetween. The first lens unit includes a diffractive optical element and an aspheric surface. The second lens unit is configured to move along the optical axis to effect focusing. In the photographic optical system, when L is a length on the optical axis from a lens surface furthest on the object side of the first lens sub-unit to an image plane of the entire photographic optical system, $d1ab$ is an air space between the first lens sub-unit and the second lens sub-unit, $f1a$ is a focal length of the first lens sub-unit, $f1b$ is a focal length of the second lens sub-unit, $fDOE$ is a focal length of the diffractive optical element by only a diffractive component, $f$ is a focal length of the entire photographic optical system, and $Fno$ is an F-number of the entire photographic optical system during focusing on an infinitely-distant object, the following conditions are satisfied:

$0.0500 < d1ab/(L \times Fno) < 0.2000$ $-1.000 < f1a/f1b < 1.000$ $5.0 < fDOE/f < 200.0.$ Further features and aspects of the present invention will become apparent to persons having ordinary skill in the art from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the present invention.

FIG. 1A is a lens cross section of a photographic optical system according to a first exemplary embodiment of the present invention during focusing on an infinitely-distant object.

FIG. 2B is an aberration chart of the photographic optical system according to the second exemplary embodiment during focusing on an infinitely-distant object.

FIG. 3A is a lens cross section of a photographic optical system according to a third exemplary embodiment of the present invention during focusing on an infinitely-distant object.

FIG. 5B is an aberration chart of the photographic optical system according to the fifth exemplary embodiment during focusing on an infinitely-distant object.

FIG. 6B is an aberration chart of the photographic optical system according to the sixth exemplary embodiment during focusing on an infinitely-distant object.

DESCRIPTION OF THE EMBODIMENTS

Figure 1B:
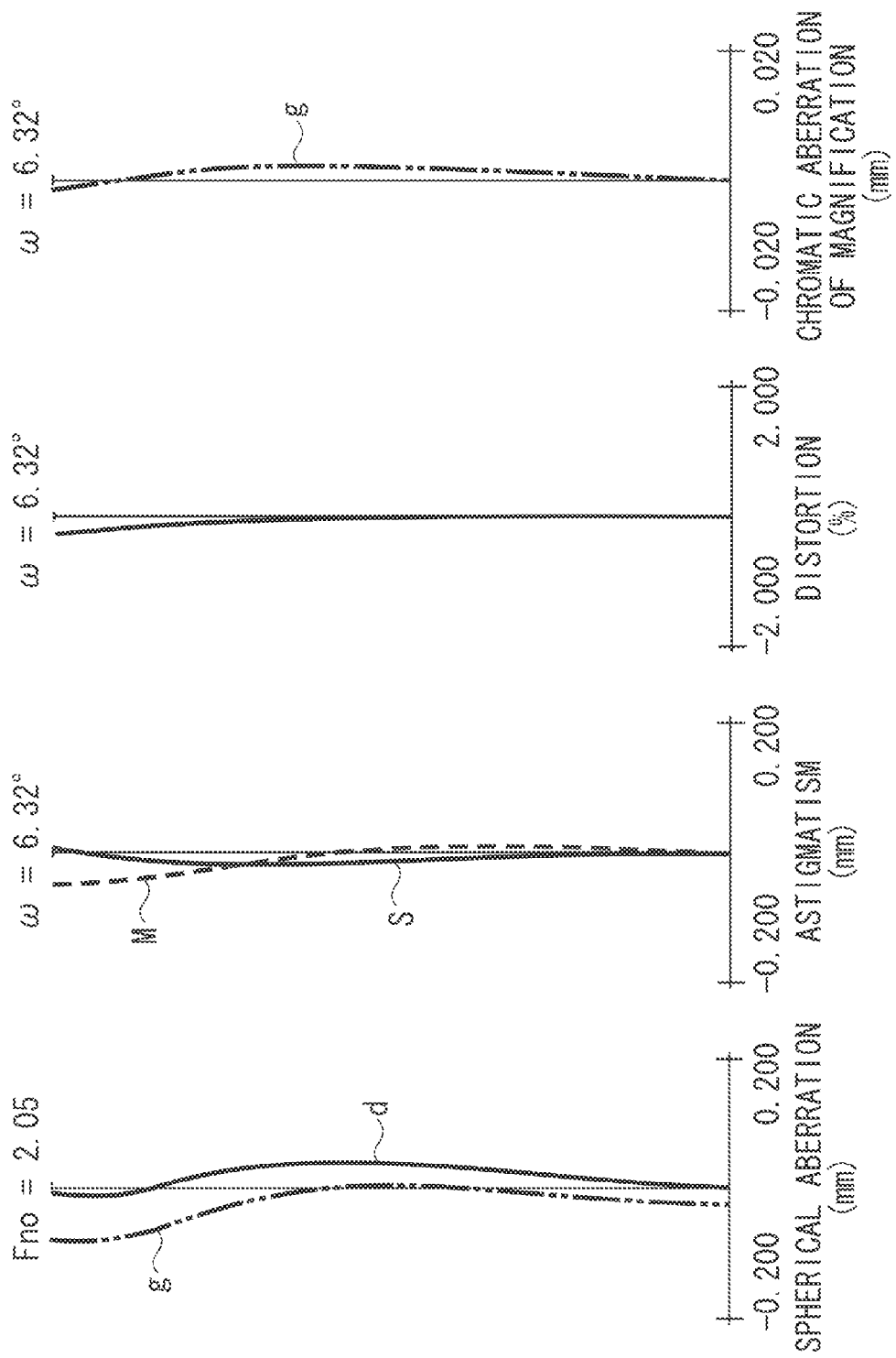
FIG. 1B is an aberration chart of the photographic optical system according to the first exemplary embodiment during focusing on an infinitely-distant object.

Various exemplary embodiments of the present invention will now be described in detail with reference to the drawings. It should be noted that the relative arrangement of the components, the numerical expressions, and numerical values set forth in these embodiments perform not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed in subsequent figures.

Note that herein when referring to correcting or corrections of an error (e.g., aberration), a reduction of the error and/or a correction of the error is intended. In addition, as used herein, the side of a lens where an object to be imaged is located is referred to as the object side or front side of the lens; and the side of the lens where the image of the object is formed is referred to as the image side or back side of the lens. Incidentally, the place where the object to be imaged is located is referred to as the object plane; the place where the image of the object is formed is referred to as the image plane.

A photographic optical system according to an exemplary embodiment of the present invention includes, in order from the object side to the image side, a first lens unit having a positive refractive power, a second lens unit having a positive or negative refractive power, and a third lens unit having a positive or negative refractive power.

The first lens unit includes a first lens sub-unit having a positive refractive power and a second lens sub-unit having a positive or negative refractive power with the largest air space provided therebetween. The first lens unit includes at least one diffractive optical element and at least one aspheric surface. The second lens unit is configured to move along the optical axis to effect focusing.

Figure 6A:
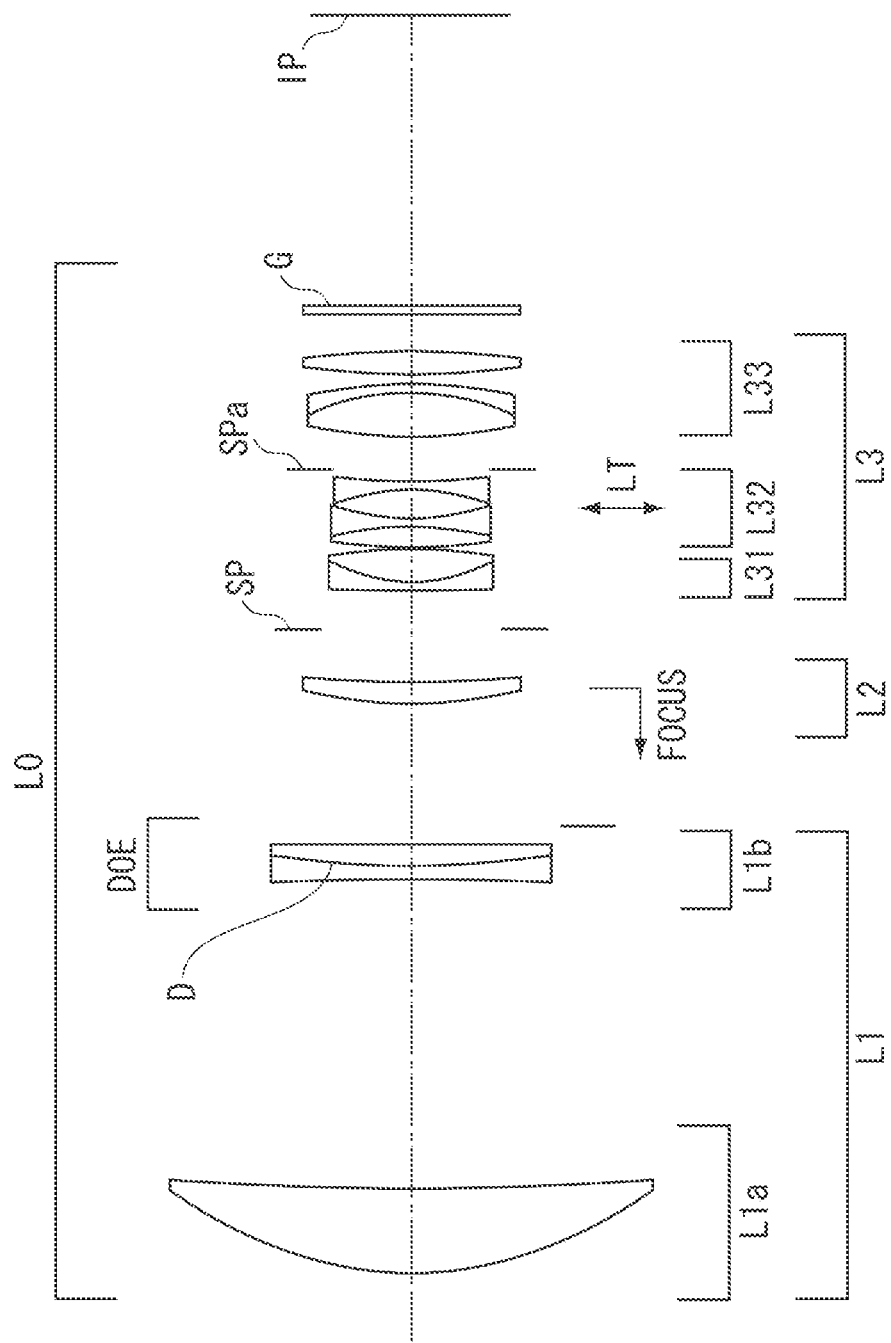
FIG. 6A is a lens cross section of a photographic optical system according to a sixth exemplary embodiment of the present invention during focusing on an infinitely-distant object.
Figure 7A:
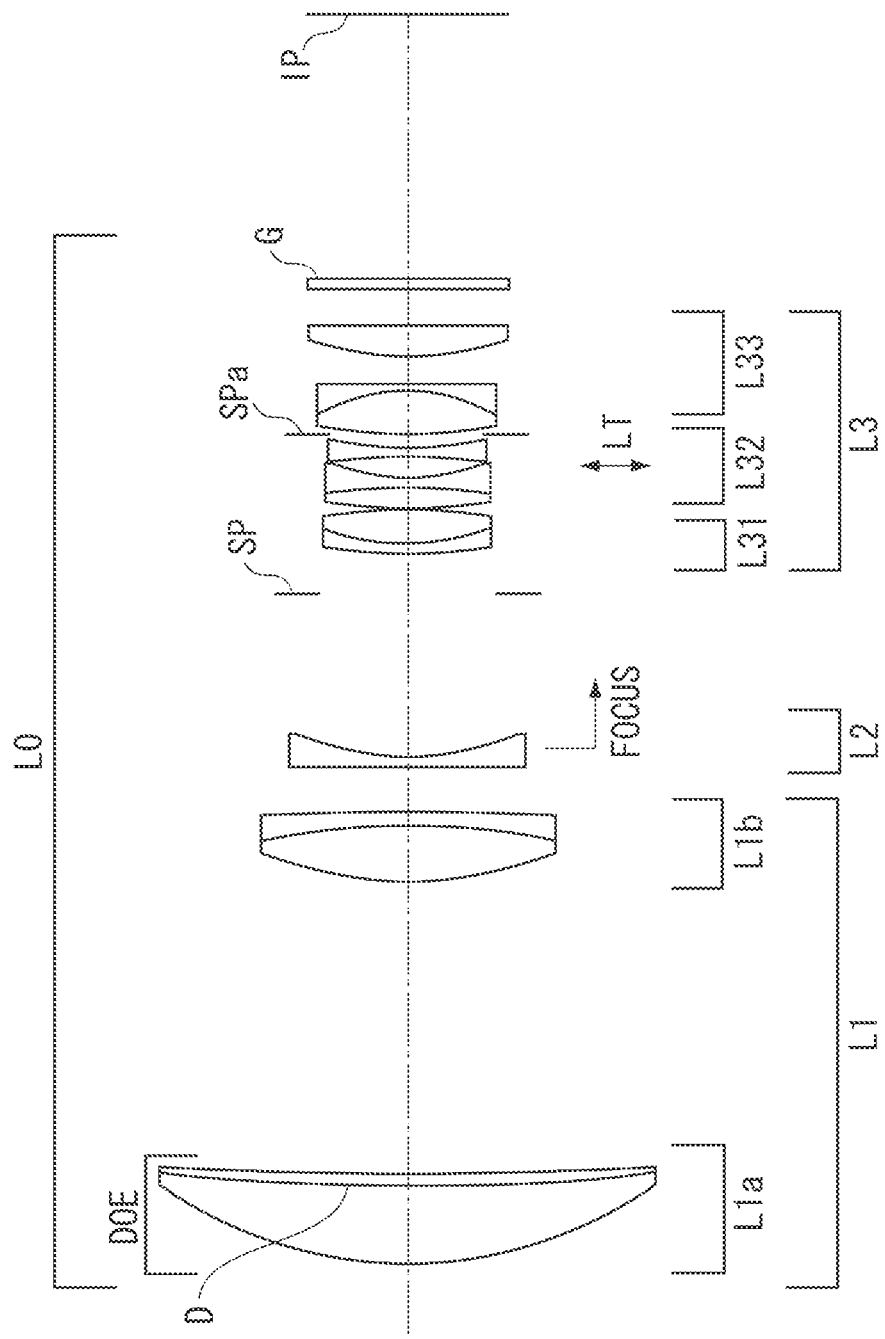
FIG. 7A is a lens cross section of a photographic optical system according to a seventh exemplary embodiment of the present invention during focusing on an infinitely-distant object.
Figure 7B:
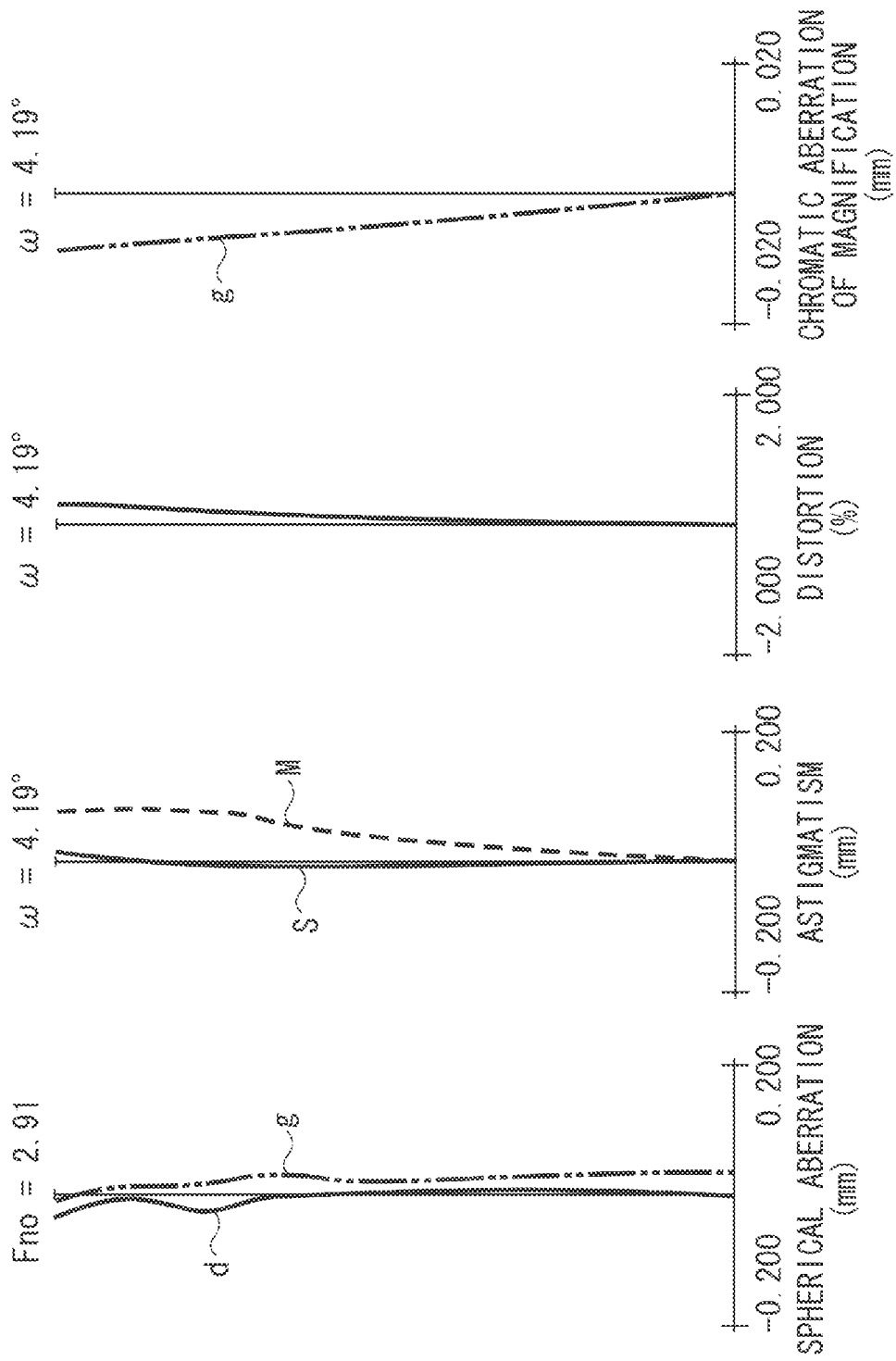
FIG. 7B is an aberration chart of the photographic optical system according to the seventh exemplary embodiment during focusing on an infinitely-distant object.
Figure 8:
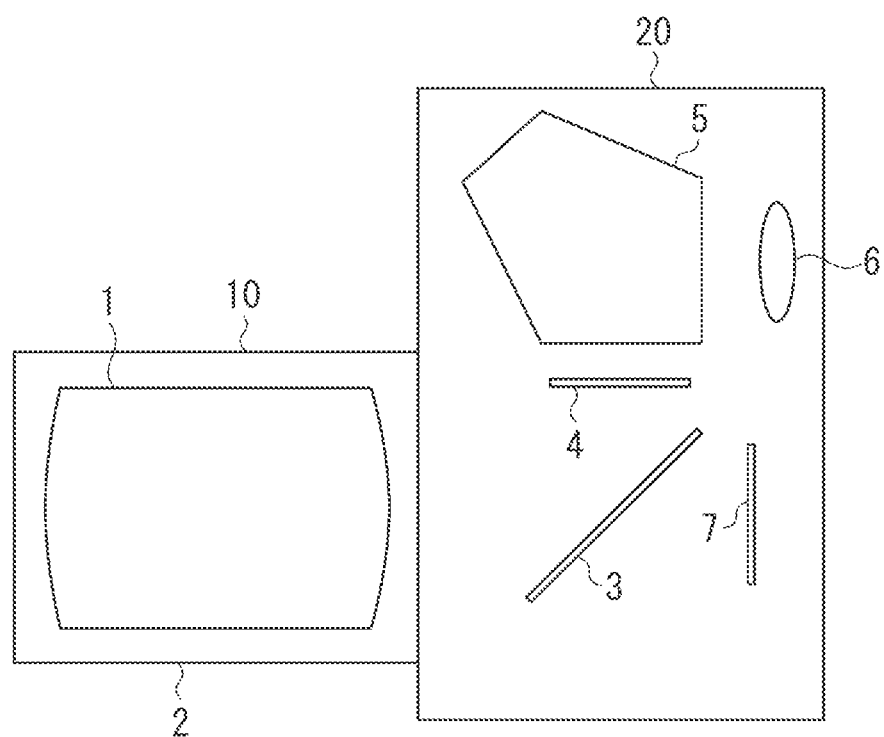
FIG. 8 illustrates an image pickup apparatus according to an exemplary embodiment of the present invention.

Each of FIGS. 1A, 2A, 3A, 4A, 5A, 6A, and 7A is a lens cross section according to the corresponding exemplary embodiment (any corresponding one of the first through the seventh exemplary embodiments) of the present invention. Each of FIGS. 1B, 2B, 3B, 4B, 5B, 6B, and 7B is a longitudinal aberration chart of the photographic optical system according to the corresponding exemplary embodiment (any corresponding one of the first through the seventh exemplary embodiments) of the present invention. FIG. 8 illustrates certain components of a single-lens reflex camera system, as an example of an image pickup apparatus, on whose camera body the photographic optical system is mounted, according to an exemplary embodiment of the present invention.

In each lens cross section (FIGS. 1A, 2A, 3A, 4A, 5A, 6A, and 7A), reference labels "L0" denotes a photographic optical system; "SP" denotes an aperture stop; and "SPa" denotes a sub aperture stop (sub diaphragm) having a fixed aperture ratio.

The photographic optical system L0 includes, from the object side to the image side and arranged along an optical axis thereof, a first lens unit L1 having a positive refractive power, a second lens unit L2, and a third lens unit L3. The first lens unit L1 includes a first lens sub-unit L1a having a positive refractive power and a second lens sub-unit L1b. The distance between the first lens sub-unit L1a and the second lens sub-unit L1b represents the largest air space provided in the photographic optical system L0.

The third lens unit L3 includes a lens sub-unit L31 having a positive refractive power, a lens sub-unit L32 having a negative refractive power, and a lens sub-unit L33 having a positive refractive power. During focusing, the lens sub-unit L32 is movable in directions perpendicular to the optical axis to displace the position at which a photographed image is formed.

The reference label "IP" denotes an image plane. The image plane IP is, when the photographic optical system according to an exemplary embodiment of the present invention is used as a photographic optical system of a video camera or a digital camera, equivalent to an imaging plane of a solid-state image sensor (photoelectric conversion element), such as a charge-coupled device (CCD) sensor or a complementary metal-oxide semiconductor (CMOS) sensor. If the photographic optical system according to an exemplary embodiment of the present invention is used as a photographic optical system of a silver-halide film camera, the image plane IP is a photosensitive surface equivalent to a film surface of the optical system of the silver-halide film camera.

"DOE" denotes a diffractive optical element. "D" denotes a diffractive optical portion (diffractive optical surface), which is included in the diffractive optical element DOE as a part thereof.

A diffraction order m of diffracted light used in each exemplary embodiment of the present invention, of diffracted light exiting from the diffractive optical portion D, is 1. A design wavelength $\lambda_0$ is the wavelength with respect to d-line light (wavelength: 587.56 nm).

In the present exemplary embodiment, the number of the diffractive optical portion D included in the photographic optical system L0 is not limited to one. In other words, a plurality of diffractive optical portions D can be used. In this case, each exemplary embodiment can appropriately improve the optical performance. The diffractive optical portion D can be manufactured with an aspheric member as its base. The material of the base can be a transparent material, such as a glass material or a plastic material.

In each aberration chart (FIGS. 1B, 2B, 3B, 4B, 5B, 6B, and 7B), "d" and "g" respectively denote d-line and g-line light. "M" and "S" respectively denote a meridional image plane and a sagittal image plane, which are represented with respect to d-line light. Chromatic aberration of magnification is represented with respect to g-line light. "Fno" denotes an F-number. "ω" denotes a half angle of view.

In each aberration chart (FIGS. 1B, 2B, 3B, 4B, 5B, 6B, and 7B), spherical aberration is represented in the unit of 0.2 mm, astigmatism is represented in the unit of 0.2 mm, distortion is represented in the unit of 2%, and chromatic aberration of magnification is represented in the unit of 0.02 mm.

The photographic optical system according to an exemplary embodiment of the present invention is constituted by a telephoto lens, which has the following configuration.

Due to the various shortcomings in aberration and weight that may occur on a telephoto lens having a high aperture ratio, it is required to reduce the weight of the entire photographic optical system and improve optical performance. In a telephoto lens, generally, a maximum value of the height from the optical axis of paraxial rays passing through the lens surface at a location closer to the object side than a point of intersection of the optical axis and a pupil paraxial ray is larger than a maximum value of the height from the optical axis of paraxial rays passing through the lens surface at a location closer to the image side than the point of intersection of the optical axis and a pupil paraxial ray.

A telephoto lens has a telephoto type configuration. Accordingly, in order to appropriately achieve a high aperture ratio (small F-number), the F-number can be set according to the diameter of a lens provided close to the object side. In this case, for the lenses included in the telephoto lens system, the lens effective diameter may become greater as the lens is closer to the object side. If the F-number is small, the effective diameter of the lens may increase. As a result, the outer diameter of the lens increases and the total weight of the glass material used for the lens increases by the cube of the increase of the outer diameter of the lens. The higher the aperture ratio of a telephoto lens becomes, the more the weight of the lens may increase easier for the lens provided close to the object side than the lens provided close to the image side.

In order to reduce the total weight of the photographic optical system while solving or preventing the above-described problems, it becomes necessary to reduce the number of constituent lenses of the first lens unit on the object side or to reduce the diameter of the lens without changing the function thereof.

In order to solve or prevent the above-described problems, in each exemplary embodiment, the power (the refractive power) of the first lens unit L1 is divided across the largest air space. More specifically, the first lens unit L1 according to each exemplary embodiment includes a first lens sub-unit L1a, which is provided on the object side of the first lens unit L1, and a second lens sub-unit L1b, which is provided on the image side. Furthermore, the first lens sub-unit L1a is assigned with a positive refractive power.

More specifically, the larger the space between the first lens sub-unit L1a and the second lens sub-unit L1b is set, the more converged the ray that has passed through the first lens sub-unit L1a can become. Accordingly, as the space between the first lens sub-unit L1a and the second lens sub-unit L1b is set larger, the smaller the diameter (effective diameter) of the lens included in the second lens sub-unit L1b can be set.

Furthermore, the more intense the refractive power of the first lens sub-unit L1a is set, the more converged the ray that has passed through the first lens sub-unit L1a can become. Accordingly, as the refractive power of the first lens sub-unit L1a is set more intense, the smaller the diameter (effective diameter) of the lens included in the second lens sub-unit L1b can be set.

However, in general, the amount of spherical aberration or coma that may occur in a telephoto lens whose F-number is small compared with the focal length is larger than the amount of spherical aberration or coma that may occur in a telephoto lens whose F-number is large compared with the focal length. In order to appropriately correct the aberrations, it becomes necessary to increase the number of lenses included in the first lens unit L1 as large as five or six.

In this case, if the space between the first lens sub-unit L1a and the second lens sub-unit L1b is merely enlarged, the lens total length may become long. As a result, it becomes necessary to use a long lens barrel. Therefore, the total weight of the photographic optical system cannot be appropriately reduced because of the heavy weight of the lens barrel.

In order to prevent the above-described problem, in the photographic optical system according to each exemplary embodiment, the first lens unit L1 includes three to four constituent lenses to provide a large space between the first lens sub-unit L1a and the second lens sub-unit L1b with a short lens total length. With the above-described small number of lenses, monochromatic aberration, among various aberrations, can be appropriately corrected by using at least one aspheric surface of the lenses included in the first lens unit L1.

In addition, in the photographic optical system according to each exemplary embodiment, the first lens unit L1 is provided with at least one diffractive optical element, which is assigned with an appropriately set refractive power, to appropriately correct chromatic aberration. With the above-described configuration, each exemplary embodiment of the present invention can achieve a photographic optical system that is light in total weight and capable of capturing a high quality image by using the first lens sub-unit L1a having a high refractive power and the second lens sub-unit L1b whose lens diameter is sufficiently small, which are provided within the first lens unit L1 with a large air space between L1a and L1b.

In most photographic optical systems, focusing is executed by moving the entire photographic optical system or by moving a part of lens units included in the photographic optical system. Furthermore, in a telephoto lens having a high aperture ratio, a long focal length, and a small F-number, the size of the constituent lenses is large. Accordingly, the total weight of a telephoto lens like this may be heavier compared to a telephoto lens having a large F-number. Accordingly, if a telephoto lens having a high aperture ratio, a long focal length, and a small F-number, in which the size of the constituent lenses is large, is used, it may be mechanically difficult to efficiently execute focusing by moving the entire telephoto lens system.

In order to prevent the above-described problem, the photographic optical system according to each exemplary embodiment executes focusing by moving the second lens unit L2, which is small, light, and provided closer to the image side than the first lens unit L1, along the optical axis. As a result, the photographic optical system according to each exemplary embodiment can more easily execute focusing by using a driving mechanism having a size far smaller than a driving mechanism used when executing focusing by moving the entire optical system or the entire first lens unit L1.

In each exemplary embodiment, an off-axis principal ray passes through the second lens unit L2 around the center (optical axis) of the second lens unit L2. Accordingly, the photographic optical system according to each exemplary embodiment executes focusing by moving the second lens unit L2. As a result, the photographic optical system according to each exemplary embodiment can easily suppress variation of aberration of off-axis rays that may occur due to the object distance.

In addition, in the photographic optical system according to each exemplary embodiment, the third lens unit L3 is located at a location closer to the image side than the second lens unit L2. With this configuration, in the photographic optical system according to each exemplary embodiment, a lens surface can be provided at a location at which the axial ray goes low and at which the off-axis principal ray goes high. With the above-described configuration, each exemplary embodiment of the present invention can easily correct curvature of field and chromatic aberration of magnification.

In each exemplary embodiment, the photographic optical system L0 includes, in order from the object side to the image side, a first lens unit L1 having a positive refractive power, a second lens unit L2 having a positive or negative refractive power, and a third lens unit L3 having a positive or negative refractive power.

The first lens unit L1 includes a first lens sub-unit L1a having a positive refractive power and a second lens sub-unit L1b having a negative refractive power with the largest allowable air space provided therebetween. The first lens unit L1 includes at least one diffractive optical element DOE and at least one aspheric surface. Furthermore, the photographic optical system according to each exemplary embodiment executes focusing by moving the second lens unit L2 along the optical axis.

In the photographic optical system according to each exemplary embodiment, when L is a length (distance) on the optical axis from a lens surface closest to the object plane to an image plane, d1ab is an air space between the first lens sub-unit L1a and the second lens sub-unit L1b, f1a is a focal length of the first lens sub-unit L1a, f1b is a focal length of the second lens sub-unit L1b, fDOE is a focal length of the diffractive optical element DOE by only a diffractive component, f is a focal length of the entire photographic optical system, and Fno is an F-number of the entire photographic optical system during focusing on an infinitely-distant object, the following conditions are satisfied:

$$0.0500 < d1ab/(L \times Fno) < 0.2000 \tag{1}$$

$$-1.000 < f1a/f1b < 1.000 \tag{2}$$

$$5.0 < fDOE/f < 200.0 \tag{3}.$$

In the above conditions, a lens surface closest to the object plane may also be referred to as lens surface furthest on the object side of the first lens sub-unit. Accordingly, L can also be defined as a distance (length) on the optical axis from a lens surface furthest on the object side of the first lens sub-unit to an image plane of the entire photographic optical system.

The technical significance of each condition will be described in detail below.

The condition (1) provides a condition for an air space between the first lens sub-unit L1a and the second lens sub-unit L1b included in the photographic optical system L0. If the upper limit value of the condition (1) is exceeded, then the space between the first lens sub-unit L1a and the second lens sub-unit L1b may become extremely large. As a result, the hollow area of the first lens unit L1 may increase.

Because the second lens sub-unit L1b is located closer to the image side, the effective diameter of the second lens sub-unit L1b can be reduced. As a result, the total weight of the photographic optical system according to each exemplary embodiment can be reduced. However, accordingly, it may become difficult to correct various aberrations, such as spherical aberration or coma, which may occur in the first lens sub-unit L1a, by using the second lens sub-unit L1b. Therefore, in this case, various aberrations, such as spherical aberration or coma, cannot be appropriately corrected.

On the other hand, if the lower limit value of the condition (1) is exceeded, then the space between the first lens sub-unit L1a and the second lens sub-unit L1b may become extremely small. Accordingly, the hollow area inside the first lens unit L1 may become small. As a result, the total weight of the photographic optical system cannot be appropriately reduced due to a large number of lenses included in the first lens unit L1.

It is further useful if the range of the value in the condition (1) is altered as follows:

$$0.0700 < d1ab/(L \times Fno) < 0.2000 \tag{1a}.$$

It is yet further useful if the range of the value in the condition (1a) is altered as follows:

$$0.0700 < d1ab/(L \times Fno) < 0.1500 \tag{1b}.$$

The condition (2) provides a condition for the power assigned to the first lens sub-unit L1a and the second lens sub-unit L1b of the photographic optical system L0. More specifically, the condition (2) provides a condition for appropriately reducing the effective diameter of the second lens sub-unit L1b. If the range of the condition (2) is exceeded, then the power of the first lens sub-unit L1a becomes lower than the power of the second lens sub-unit L1b. As a result, the incident ray cannot be appropriately converged by the first lens sub-unit L1a. Accordingly, in this case, it becomes necessary to use a lens having a large diameter for the second lens sub-unit L1b.

It is further useful if the range of the value in the condition (2) is altered as follows:

$$-0.850 < f1a/f1b < 0.850 \quad (2a).$$

The condition (3) provides a condition for the power assigned to the diffractive optical element DOE included in the first lens unit L1 of the photographic optical system L0.

If the upper limit value of the condition (3) is exceeded, then the power of the diffractive optical element DOE generated by only a diffractive component may become very small. As a result, it becomes difficult to effectively correct chromatic aberration occurring in the first lens unit L1.

On the other hand, if the lower limit value of the condition (3) is exceeded, then the power of the diffractive optical element DOE generated by only a diffractive component may become very large. As a result, it becomes necessary to reduce the grating pitch of the diffraction grating. In this case, it may become difficult to manufacture the photographic optical system.

In addition, if the lower limit value of the condition (3) is exceeded (i.e., if the power of the diffractive optical element DOE is extremely increased beyond the lower limit value of the condition (3)), then it becomes difficult to balance axial chromatic aberration and chromatic aberration of magnification, which are in an opposite relationship.

It is further useful if the range of the value in the condition (3) is altered as follows:

$$7.0 < fDOE/f < 150.0 \quad (3a)$$

The photographic optical system according to each exemplary embodiment of the present invention can be achieved by the above-described configuration. However, the photographic optical system according to each exemplary embodiment of the present invention can also be configured to satisfy at least one of the following conditions to further improve the optical performance of the photographic optical system. More specifically, when f1 is a focal length of the first lens unit L1, f2 is a focal length of the second lens unit L2, f3 is a focal length of the third lens unit L3, and f31, f32, and f33 are focal lengths of the lens sub-unit L31, the lens sub-unit L32, and the lens sub-unit L33, respectively, at least one of the following conditions is satisfied:

$$0.460 < f/(f1a \times Fno) < 1.000 \quad (4)$$

$$0.0430 < ((f1/f1a) \times d1ab)/(f \times Fno) < 0.3000 \quad (5)$$

$$0.50 < |f1/f2| < 2.20 \quad (6)$$

$$0.10 < |f2/f3| < 1.00 \quad (7)$$

$$0.10 < |f2/f| < 2.00 \quad (8)$$

$$0.30 < |f3/f| < 10.00 \quad (9)$$

$$0.10 < f31/f < 3.00 \quad (10)$$

$$-0.50 < f32/f < -0.05 \quad (11)$$

$$0.05 < f33/f < 0.50 \quad (12).$$

The technical significance of each of the above-described conditions (4) through (12) will be described in detail below.

The condition (4) provides a condition for the power assigned to the first lens sub-unit L1a of the photographic optical system L0.

If the upper limit value of the condition (4) is exceeded, then the power assigned to the first lens sub-unit L1a may become extremely intense. Accordingly, the effect of reducing the weight of the first lens unit L1 may increase. However, it becomes difficult to correct spherical aberration and coma that have occurred in the first lens sub-unit L1a by using the subsequent lens units including the second lens sub-unit L1b.

On the other hand, if the lower limit value of the condition (4) is exceeded, then the power assigned to the first lens sub-unit L1a may become extremely low. Accordingly, in this case, the lens effective diameter of the second lens sub-unit L1b becomes large. As a result, the total lens weight of the first lens unit L1 cannot be appropriately reduced.

It is further useful if the range of the value in the condition (4) is altered as follows:

$$0.470 < f/(f1a \times Fno) < 1.000 \quad (4a).$$

It is yet further useful if the range of the value in the condition (4a) is altered as follows:

$$0.470 < f/(f1a \times Fno) < 0.700 \quad (4b).$$

The condition (5) provides a condition for the balance between the power assigned to the first lens sub-unit L1a of the photographic optical system L0 and the air space between the first lens sub-unit L1a and the second lens sub-unit L1b. If the upper limit value of the condition (5) is exceeded, then the power of the first lens sub-unit L1a becomes very intense or the space between the first lens sub-unit L1a and the second lens sub-unit L1b becomes large. As a result, the effect of reducing the weight of the first lens unit L1 becomes large but it becomes difficult to correct spherical aberration and coma that has occurred in the first lens sub-unit L1a by using the subsequent lens units including the second lens sub-unit L1b.

On the other hand, if the lower limit value of the condition (5) is exceeded, then the power of the first lens sub-unit L1a becomes very small or the space between the first lens sub-unit L1a and the second lens sub-unit L1b becomes small. As a result, the lens effective diameter of the second lens sub-unit L1b may become large. In addition, the hollow area inside the first lens unit L1 may become small. Accordingly, in this case, the total lens weight of the first lens unit L1 cannot be appropriately reduced.

It is further useful if the range of the value in the condition (5) is altered as follows:

$$0.0450 < ((f1/f1a) \times d1ab)/(f \times Fno) < 0.3000 \quad (5a).$$

It is yet further useful if the range of the value in the condition (1a) is altered as follows:

$$0.0450 < ((f1/f1a) \times d1ab)/(f \times Fno) < 0.2000 \quad (5b).$$

The condition (6) provides a condition for the balance between the powers of the first lens unit L1 and the second lens unit L2 of the photographic optical system L0. More specifically, the condition (6) provides a condition for appropriately reducing the effective diameter of the second lens unit L2.

If the upper limit value of the condition (6) is exceeded, then the power of the first lens unit L1 becomes smaller than the power of the second lens unit L2. In addition, the ray incident to the first lens unit L1 cannot be appropriately converged by the first lens unit L1. As a result, the lens effective diameter of the second lens unit L2 may become large.

On the other hand, if the lower limit value of the condition (6) is exceeded, then the power of the first lens unit L1 becomes more intense than the power of the second lens unit L2. Accordingly, the effect of reducing the total lens weight, which is achieved by the reduction of the lens diameter of the second lens unit L2, may increase. However, spherical aberration, coma, and chromatic aberration that have occurred in the first lens unit L1 may not be completely corrected. Accordingly, in this case, it becomes difficult to correct spherical aberration, coma, and chromatic aberration by using the subsequent units including the second lens unit L2.

It is further useful if the range of the value in the condition (6) is altered as follows:

$$0.50 < |f1/f2| < 2.00 \tag{6a}$$

It is yet further useful if the range of the value in the condition (6a) is altered as follows:

$$0.70 < |f1/f2| < 2.00 \tag{6b}$$

The condition (7) provides a condition for the balance between the powers of the second lens unit L2 and the third lens unit L3 of the photographic optical system L0. If the upper limit value of the condition (7) is exceeded, then the power of the third lens unit L3 becomes more intense than the power of the second lens unit L2. If the power of the third lens unit L3 becomes very intense, curvature of field may increase. In this case, it becomes difficult to correct curvature of field.

On the other hand, if the lower limit value of the condition (7) is exceeded, then the power of the second lens unit L2 becomes more intense than the power of the third lens unit L3.

If the power assigned to the second lens unit L2 becomes extremely intense, spherical aberration may increase. As a result, it becomes difficult to correct spherical aberration.

It is further useful if the range of the value in the condition (7) is altered as follows:

$$0.20 < |f2/f3| < 1.00 \tag{7a}$$

It is yet further useful if the range of the value in the condition (7a) is altered as follows:

$$0.20 < |f2/f3| < 0.75 \tag{7b}$$

The condition (8) provides a condition for the power assigned to the second lens unit L2 of the photographic optical system L0. If the upper limit value of the condition (8) is exceeded, then the power of the second lens unit L2 becomes small. Accordingly, in this case, the amount of movement of the second lens unit L2 during focusing increases. As a result, the total size of the lens system may become large.

On the other hand, if the lower limit value of the condition (8) is exceeded, then the amount of movement of the second lens unit L2 during focusing can be reduced, but a large amount of various aberrations, particularly, spherical aberration, may occur in the second lens unit L2. As a result, it becomes difficult to balance various aberrations to be corrected for the first lens unit L1 and the third lens unit L3.

It is further useful if the range of the value in the condition (8) is altered as follows:

$$0.20 < |f2/f| < 2.00 \tag{8a}$$

It is yet further useful if the range of the value in the condition (8a) is altered as follows:

$$0.20 < |f2/f| < 1.50 \tag{8b}$$

The condition (9) provides a condition for the power assigned to the third lens unit L3 of the photographic optical system L0. If the upper limit value of the condition (9) is exceeded, then the power of the third lens unit L3 becomes small. As a result, it becomes necessary to control the back focus with the first lens unit L1 and the second lens unit L2. Accordingly, in this case, the flexibility of assigning the power to the first lens unit L1 and the second lens unit L2 to correct aberrations may decrease. As a result, spherical aberration and coma may not be completely corrected.

On the other hand, if the lower limit value of the condition (9) is exceeded, then the power of the third lens unit L3 becomes very intense. As a result, the amount of various aberrations, such as curvature of field or distortion, may increase to a level too large to be appropriately corrected.

It is further useful if the range of the value in the condition (9) is altered as follows:

$$0.50 < |f3/f| < 10.00 \tag{9a}$$

It is yet further useful if the range of the value in the condition (9a) is altered as follows:

$$0.50 < |f3/f| < 5.00 \tag{9b}$$

Each of the conditions (10) through (12) provides a condition for appropriately setting the power of each lens sub-unit included in the third lens unit L3. By satisfying the ranges of the conditions (10) through (12), the photographic optical system according to each exemplary embodiment can achieve a high quality image with a high image displacement sensitivity in displacing the image forming position by moving the lens sub-unit L32 in directions perpendicular to the optical axis.

If the ranges of the conditions (10) through (12) are exceeded, then it becomes difficult to balance the powers of the lens sub-units included in the third lens unit L3.

It is further useful if the ranges of the value in the conditions (10) through (12) are altered as follows:

$$0.12 < f31/f < 2.00 \tag{10a}$$

$$0.40 < f32/f < -0.05 \tag{11a}$$

$$0.07 < f33/f < 0.40 \tag{12a}$$

With the above-described configuration, each exemplary embodiment of the present invention can correct chromatic aberration for the entire image plane. Accordingly, each exemplary embodiment can achieve a photographic optical system having a high optical performance.

In addition, in the photographic optical system according to each exemplary embodiment, the first lens sub-unit L1a of the first lens unit L1 includes one positive lens, or two lenses. The second lens sub-unit L1b includes one positive lens and one negative lens.

With the above-described configuration, each exemplary embodiment of the present invention can easily enlarge the space between the first lens sub-unit L1a and the second lens sub-unit L1b with as small a number of lenses as possible. As a result, the total weight of the first lens unit L1 can be more easily reduced.

In each exemplary embodiment, the aperture stop SP is provided between the second lens unit L2 and the third lens unit L3. More specifically, it is useful to provide the aperture stop SP between the second lens unit L2 and the third lens unit L3 because the intersection between the off-axis principal ray and the optical axis exists at a position close to the portion between the second lens unit L2 and the third lens unit L3 existing around the center of the lens system. As a result, a sufficient amount of peripheral light can be secured even if the aperture of the aperture stop SP is reduced.

In order to improve the dustproof capability, the easiness of assemblage, and the mechanical strength of the photographic optical system, it is useful to locate, on a cemented lens surface, the diffractive surface (diffractive optical portion) D of the diffractive optical element DOE, which is provided on the optical path.

In each exemplary embodiment, the first lens unit L1 and the second lens unit L2, as a whole, are assigned with a positive refractive power when the powers of the first lens unit L1 and the second lens unit L2 are combined together. In addition, the converged ray that has exited from the second lens unit L2 is further converged by the lens sub-unit L31 having a positive refractive power. Accordingly, the photographic optical system according to each exemplary embodiment can easily reduce the lens diameter of the lens sub-unit L32 (an image displacement correction lens unit).

The photographic optical system according to each exemplary embodiment includes the lens sub-unit L33 having a positive refractive power. Accordingly, each exemplary embodiment can increase the refractive power of the lens sub-unit L32, which has a negative refractive power, while maintaining an appropriate focal length of the entire optical system.

Therefore, the lens sub-unit L32 can be moved with a small eccentricity during focusing. Accordingly, the image forming position on the image forming plane can be greatly and easily displaced. In the following description, the relationship between the amount of the eccentricity and the displacement of image forming position is referred to as the "image displacement sensitivity".

Now, an exemplary lens configuration of each exemplary embodiment will be described in detail below. The reference symbol and numeral provided to each lens described below correspond to those provided to each lens described above. To begin with, an exemplary lens configuration commonly applied to each exemplary embodiment will be described in detail.

In each exemplary embodiment, the photographic optical system includes, in order from the object side to the image side, the first lens unit L1 having a positive refractive power, the second lens unit L2 having a positive or negative refractive power, and the third lens unit L3 having a positive or negative refractive power. In addition, the photographic optical system includes the aperture stop SP between the second lens unit L2 and the third lens unit L3.

In addition, the third lens unit L3 includes the lens sub-unit L31 having a positive refractive power, the lens sub-unit L32 having a negative refractive power, and the lens sub-unit L33 having a positive refractive power.

As a vibration compensation method, the photographic optical system according to each exemplary embodiment corrects an image shake, which may occur on a photographed image when the photographic optical system is vibrated during shooting, by moving the lens sub-unit L32, which is used as an image displacement correction lens unit, in directions perpendicular to the optical axis as indicated by an arrow LT in the figures.

Now, an exemplary configuration of each exemplary embodiment will be described in detail below. To begin with, the photographic optical system L0 according to the first exemplary embodiment will be described in detail below with reference to FIG. 1A.

The first lens unit L1 includes the first lens sub-unit L1a, which is constituted by one positive lens, and the second lens sub-unit L1b, which includes one cemented lens constituted by one positive lens and one negative lens. The cemented lens constitutes the diffractive optical element DOE. The diffractive optical portion D, which is included in the diffractive optical element DOE, is provided on a cemented surface of the second lens sub-unit L1b.

The lens surface of the first lens sub-unit L1a closest to the object side and the lens surface of the second lens sub-unit L1b closest to the object side have an aspheric shape. The sub aperture stop SPa is provided on the image side of the second lens sub-unit L1b. The sub aperture stop SPa has a fixed opening diameter. The second lens unit L2 includes one cemented lens constituted by one positive lens and one negative lens.

In the third lens unit L3, the lens sub-unit L31 includes one cemented lens constituted by one negative lens and one positive lens. The lens surface of the lens sub-unit L31 closest to the object side has an aspheric shape. The lens sub-unit L32 includes one negative lens and a cemented lens constituted by one positive lens and one negative lens. The lens sub-unit L33 includes one cemented lens, constituted by one positive lens and one negative lens, and one positive lens. Focusing from an infinitely-distant object to a short-distance object is executed by moving the second lens unit L2 towards the image side along the optical axis.

Figure 2A:
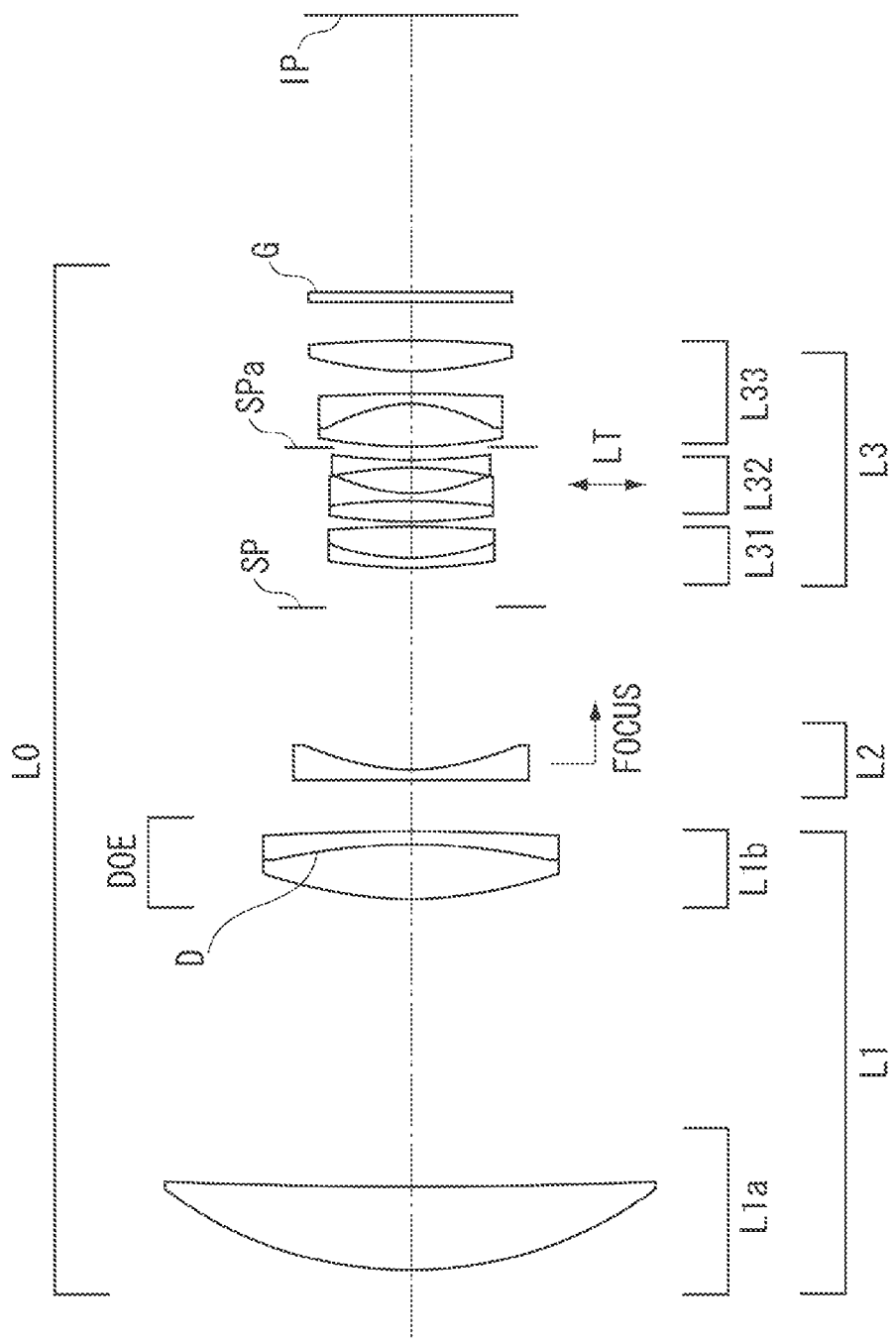
FIG. 2A is a lens cross section of a photographic optical system according to a second exemplary embodiment of the present invention during focusing on an infinitely-distant object.
Figure 3B:
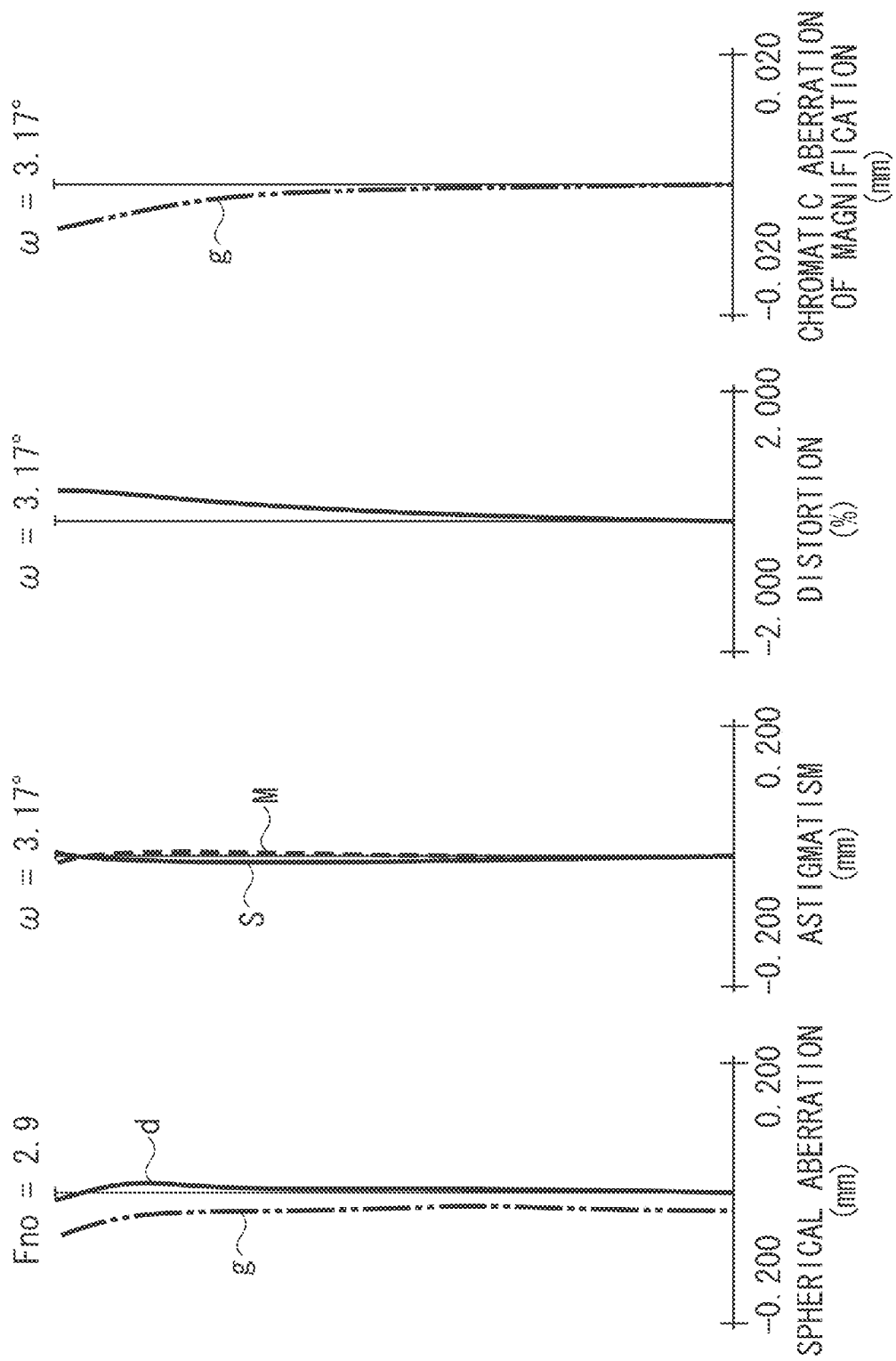
FIG. 3B is an aberration chart of the photographic optical system according to the third exemplary embodiment during focusing on an infinitely-distant object.

The photographic optical system L0 according to the second exemplary embodiment will be described in detail below with reference to FIG. 2A.

The first lens unit L1 includes the first lens sub-unit L1a, which is constituted by one positive lens, and the second lens sub-unit L1b, which includes one cemented lens constituted by one positive lens and one negative lens. The cemented lens constitutes the diffractive optical element DOE. The diffractive optical portion D, which is included in the diffractive optical element DOE, is provided on a cemented surface of the second lens sub-unit L1b.

The lens surface of the first lens sub-unit L1a closest to the object side and the lens surface of the second lens sub-unit L1b closest to the object side have an aspheric shape. The second lens unit L2 is constituted by one negative lens.

In the third lens unit L3, the lens sub-unit L31 includes one cemented lens constituted by one negative lens and one positive lens. The lens sub-unit L32 includes a cemented lens, constituted by one positive lens and one negative lens, and one negative lens. On the image side of the lens sub-unit L32, the sub aperture stop SPa, which has a fixed opening diameter, is provided.

The lens sub-unit L33 includes one cemented lens, constituted by one positive lens and one negative lens, and one positive lens. Focusing from an infinitely-distant object to a short-distance object is executed by moving the second lens unit L2 towards the image side along the optical axis.

The photographic optical system L0 according to the third exemplary embodiment will be described in detail below with reference to FIG. 3A.

The first lens unit L1 includes the first lens sub-unit L1a, which is constituted by one positive lens, and the second lens sub-unit L1b, which includes one cemented lens constituted by one positive lens and one negative lens. The cemented lens constitutes the diffractive optical element DOE. The diffractive optical portion D, which is included in the diffractive optical element DOE, is provided on a cemented surface of the second lens sub-unit L1b.

The lens surface of the first lens sub-unit L1a closest to the object side and the lens surface of the second lens sub-unit L1b closest to the object side have an aspheric shape. The second lens unit L2 includes one cemented lens constituted by one positive lens and one negative lens. The lens surface of the second lens unit L2 closest to the image side has an aspheric shape.

In the third lens unit L3, the lens sub-unit L31 includes one cemented lens constituted by one negative lens and one positive lens. The lens sub-unit L32 includes a cemented lens, constituted by one positive lens and one negative lens, and one negative lens. The lens sub-unit L33 includes one positive lens and one cemented lens constituted by one positive lens and one negative lens.

The lens surface of the lens sub-unit L33 closest to the object side has an aspheric shape. Focusing from an infinitely-distant object to a short-distance object is executed by moving the second lens unit L2 towards the image side along the optical axis.

Figure 4A:
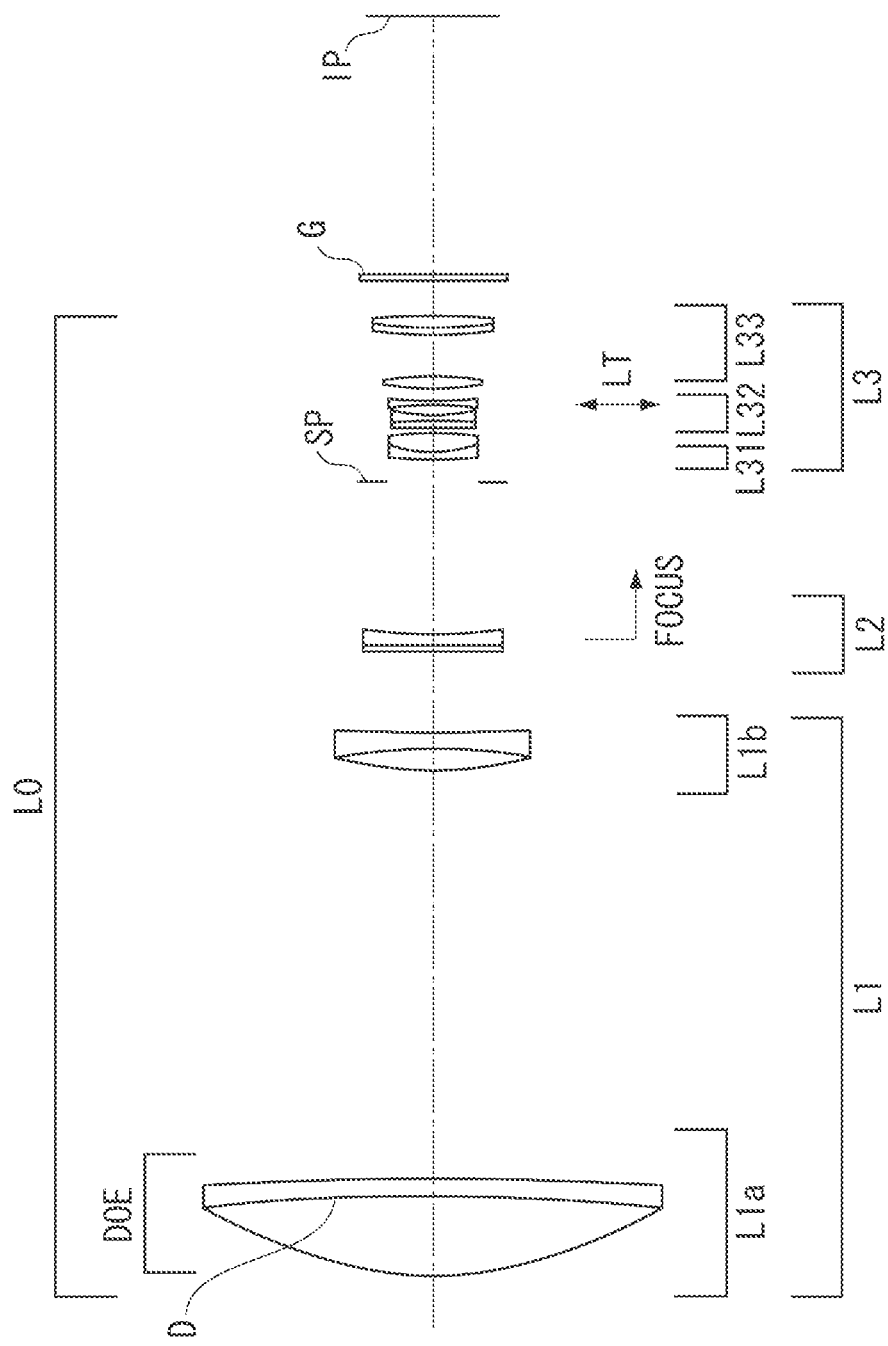
FIG. 4A is a lens cross section of a photographic optical system according to a fourth exemplary embodiment of the present invention during focusing on an infinitely-distant object.
Figure 4B:
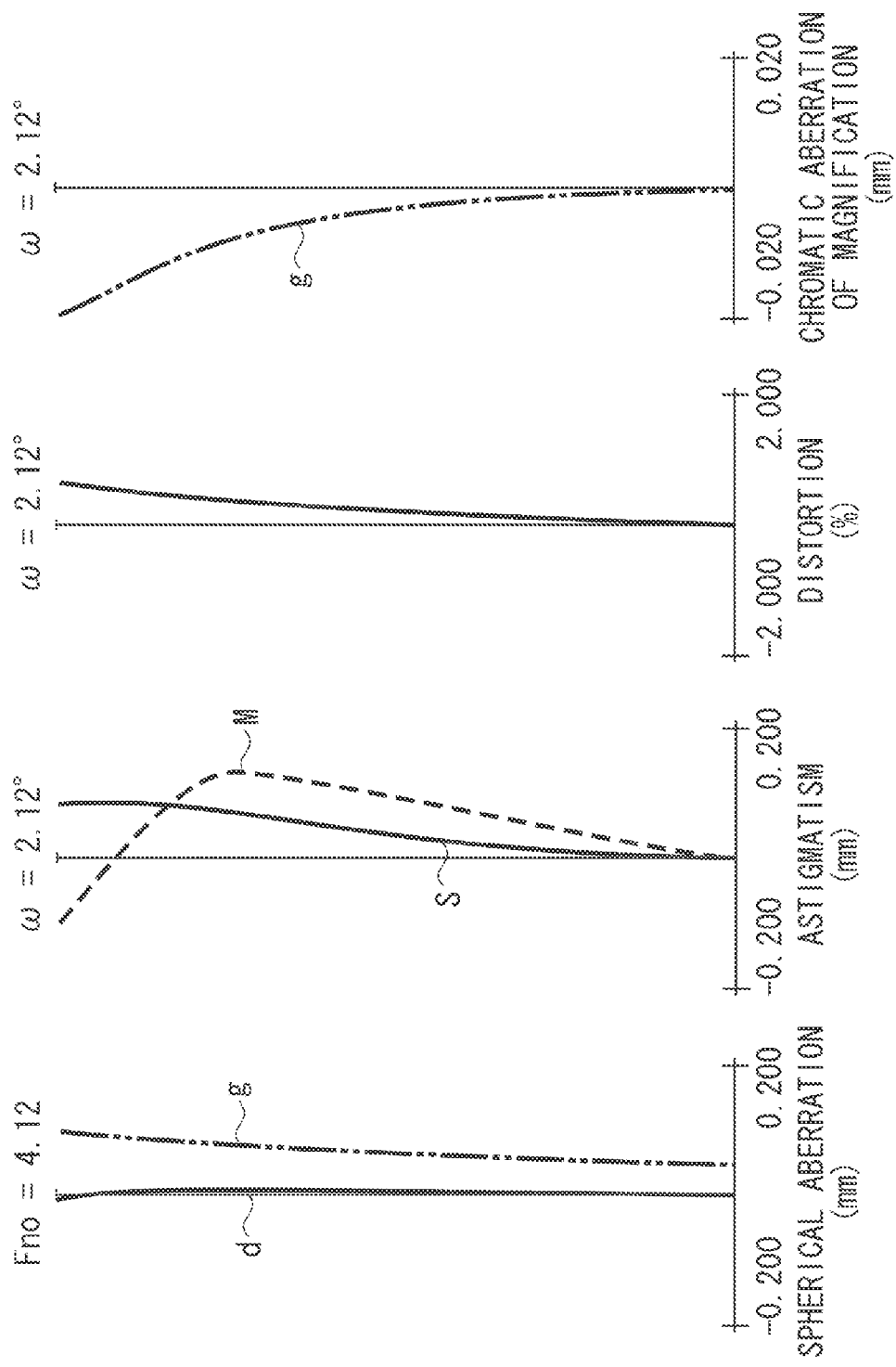
FIG. 4B is an aberration chart of the photographic optical system according to the fourth exemplary embodiment during focusing on an infinitely-distant object.

The photographic optical system L0 according to the fourth exemplary embodiment will be described in detail below with reference to FIG. 4A.

The first lens unit L1 includes the first lens sub-unit L1a, which includes one cemented lens constituted by one positive lens and one negative lens. Furthermore, the first lens unit L1 includes the second lens sub-unit L1b, which includes one cemented lens constituted by one positive lens and one negative lens. The cemented lens included in the second lens sub-unit L1b constitutes the diffractive optical element DOE. The diffractive optical portion D, which is included in the diffractive optical element DOE, is provided on a cemented surface of the first lens sub-unit L1a.

The lens surface of the first lens sub-unit L1a closest to the object side and the lens surface of the second lens sub-unit L1b closest to the object side have an aspheric shape. The second lens unit L2 includes one cemented lens constituted by one positive lens and one negative lens.

In the third lens unit L3, the lens sub-unit L31 includes one cemented lens constituted by one negative lens and one positive lens. The lens sub-unit L32 includes a cemented lens, constituted by one positive lens and one negative lens, and one negative lens.

The lens sub-unit L33 includes one positive lens and one cemented lens constituted by one negative lens and one positive lens. Focusing from an infinitely-distant object to a short-distance object is executed by moving the second lens unit L2 towards the image side along the optical axis.

Figure 5A:
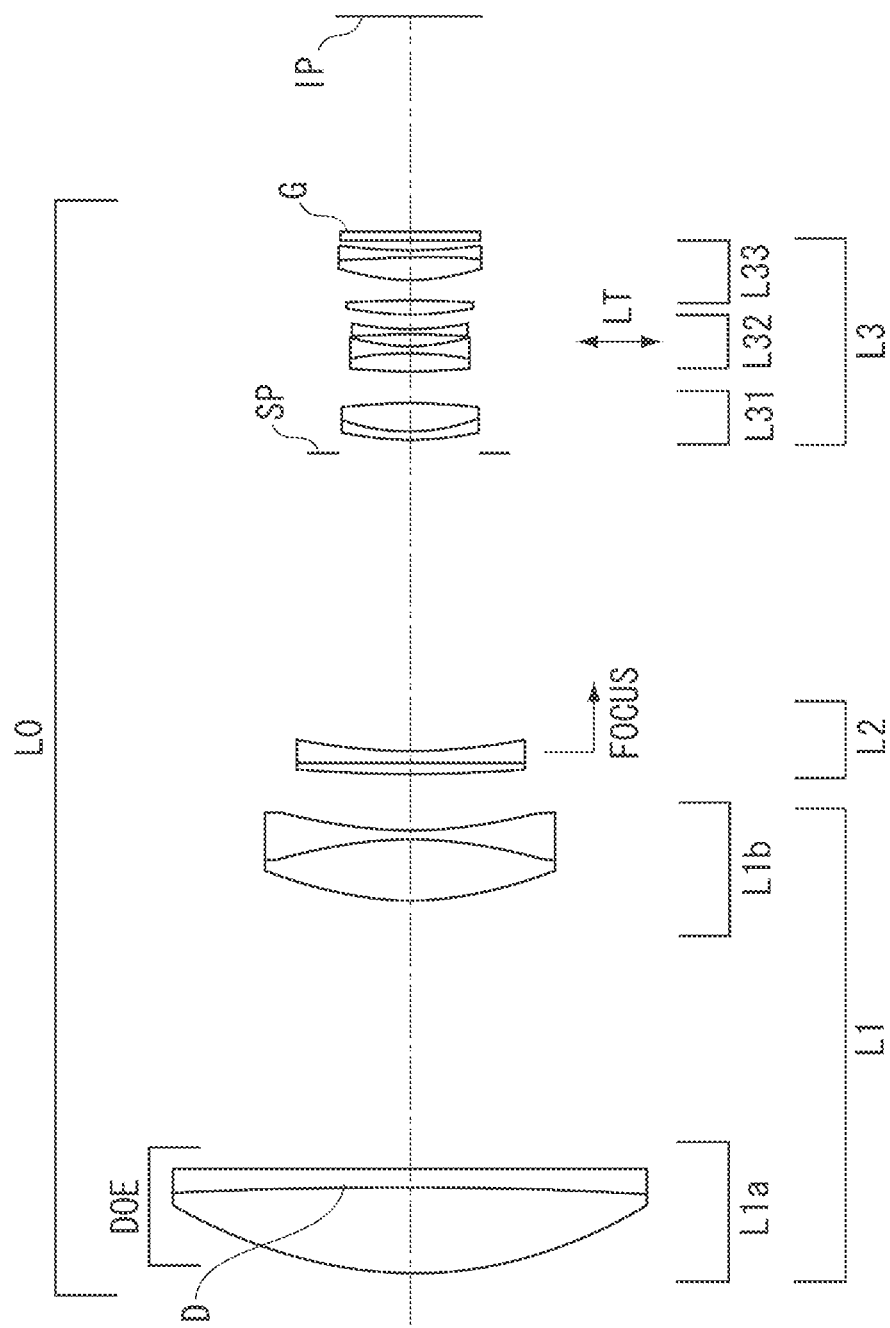
FIG. 5A is a lens cross section of a photographic optical system according to a fifth exemplary embodiment of the present invention during focusing on an infinitely-distant object.

The photographic optical system L0 according to the fifth exemplary embodiment will be described in detail below with reference to FIG. 5A.

The first lens unit L1 includes the first lens sub-unit L1a, which includes one cemented lens constituted by one positive lens and one negative lens. Furthermore, the first lens unit L1 includes the second lens sub-unit L1b, which includes one cemented lens constituted by one positive lens and one negative lens. The cemented lens included in the second lens sub-unit L1b constitutes the diffractive optical element DOE. The diffractive optical portion D, which is included in the diffractive optical element DOE, is provided on a cemented surface of the first lens sub-unit L1a.

The lens surface of the first lens sub-unit L1a closest to the object side and the lens surface of the second lens sub-unit L1b closest to the object side have an aspheric shape. The second lens unit L2 includes one cemented lens constituted by one positive lens and one negative lens. The lens surface of the second lens unit L2 closest to the image side has an aspheric shape.

In the third lens unit L3, the lens sub-unit L31 includes one cemented lens constituted by one negative lens and one positive lens. The lens sub-unit L32 includes a cemented lens, constituted by one positive lens and one negative lens, and one negative lens.

The lens sub-unit L33 includes one positive lens and one cemented lens constituted by one negative lens and one positive lens. The surface of the cemented lens included in the lens sub-unit L33 closest to the object side has an aspheric shape. Focusing from an infinitely-distant object to a short-distance object is executed by moving the second lens unit L2 towards the image side along the optical axis.

The photographic optical system L0 according to the sixth exemplary embodiment will be described in detail below with reference to FIG. 6A.

The first lens unit L1 includes the first lens sub-unit L1a, which is constituted by one positive lens, and the second lens sub-unit L1b, which includes one cemented lens constituted by one negative lens and one positive lens. The cemented lens constitutes the diffractive optical element DOE. The diffractive optical portion D, which is included in the diffractive optical element DOE, is provided on a cemented surface of the second lens sub-unit L1b.

The lens surface of the first lens sub-unit L1a closest to the object side and the lens surface of the second lens sub-unit L1b closest to the object side have an aspheric shape. The second lens unit L2 includes one positive lens. The lens surface of the second lens unit L2 closest to the object side has an aspheric shape.

In the third lens unit L3, the lens sub-unit L31 includes one cemented lens constituted by one negative lens and one positive lens. The lens sub-unit L32 includes a cemented lens, constituted by one positive lens and one negative lens, and one negative lens. On the image side of the lens sub-unit L32, the sub aperture stop SPa, which has a fixed opening diameter, is provided:

The lens sub-unit L33 includes one cemented lens, constituted by one positive lens and one negative lens, and one positive lens. The surface of the positive lens included in the lens sub-unit L33 provided closer to the image side has an aspheric shape. Focusing from an infinitely-distant object to a short-distance object is executed by moving the second lens unit L2 towards the object side along the optical axis.

The photographic optical system L0 according to the seventh exemplary embodiment will be described in detail below with reference to FIG. 7A.

The first lens unit L1 includes the first lens sub-unit L1a, which includes one cemented lens constituted by one positive lens and another positive lens. In addition, the first lens unit L1 includes the second lens sub-unit L1b, which includes one cemented lens constituted by one positive lens and one negative lens.

The cemented lens of the first lens sub-unit L1a is included in the diffractive optical element DOE. The diffractive optical portion D, which is included in the diffractive optical element DOE, is provided on a cemented surface of the first lens sub-unit L1a.

The lens surface of the first lens sub-unit L1a closest to the object side and the lens surface of the second lens sub-unit L1b closest to the object side have an aspheric shape. The second lens unit L2 includes one negative lens.

In the third lens unit L3, the lens sub-unit L31 includes one cemented lens constituted by one negative lens and one positive lens. The lens sub-unit L32 includes a cemented lens, constituted by one positive lens and one negative lens, and one negative lens. On the image side of the lens sub-unit L32, the sub aperture stop SPa, which has a fixed opening diameter, is provided.

The lens sub-unit L33 includes one cemented lens, constituted by one positive lens and one negative lens, and one positive lens. Focusing from an infinitely-distant object to a short-distance object is executed by moving the second lens unit L2 towards the image side along the optical axis.

Now, an exemplary configuration of the diffractive optical element DOE used in the photographic optical system L0 according to each exemplary embodiment will be described in detail below. The diffraction grating used by each exemplary embodiment is a known single-layer or multiple-layer diffraction grating.

In other words, the diffractive optical portion D, which is included in the diffractive optical element DOE provided within the photographic optical system L0, includes a diffraction grating that is rotationally symmetrical with respect to the optical axis. The diffractive optical element includes, on its substrate (transparent substrate), a diffraction grating (diffractive optical portion) having one layer or a plurality of layers laminated thereon.

For an optical material of the diffraction grating, an ultraviolet (UV) curable resin material (whose refractive index $N_d=1.153$ and Abbe number $\nu_d=51.0$) is used. In each exemplary embodiment, if the diffraction grating has a single layer configuration, the thickness of the grating portion of the diffraction grating is set at 1.03 μm. With this configuration, the effect of diffraction of plus first-order diffracted light having a wavelength of 530 nm can reach its maximum level. In other words, the diffraction grating is designed with the plus first order and the wavelength of 530 nm.

In addition, a lamination type diffractive optical element including a plurality of laminated diffraction gratings made of different materials can be applied to each exemplary embodiment. If the lamination type diffractive optical element is used, a first diffraction grating made of a UV curable resin material (whose refractive index $n_d=1.499$ and Abbe number $\nu_d=54$) is formed on the substrate at first. Then, a second diffraction grating (whose refractive index $n_d=1.598$ and Abbe number $\nu_d=28$) is formed on the substrate having the first diffraction grating formed thereon.

When the above-described materials are used in combination, the grating thickness of the grating portion of the first diffraction grating $d_1$ is 13.8 μm and the grating thickness of the grating portion of the second diffraction grating $d_2$ is 10.5 μm. As described above, in each exemplary embodiment, the photographic optical system uses the diffractive optical element that includes the above-described lamination type diffraction grating. Accordingly, each exemplary embodiment can achieve a high diffraction efficiency of 95% and higher for the entire available wavelength range (i.e., the entire visible region) for the design-order (plus first-order) diffracted light.

In each exemplary embodiment, the diffractive optical portion is provided on the optical surface. More specifically, the base of the diffractive optical portion D is not limited to an aspheric surface. In other words, the diffractive optical portion D can be based on a flat surface or a spherical surface. The diffractive optical portion D can be generated by a replica aspheric surface generation method, in which a film, such as a plastic film, is added as a diffractive optical portion (diffractive surface).

For the shape of the diffraction grating, the displacement $\phi(H)$ at a distance H from the optical axis can be calculated by the following expression (a):

$$\phi(H) = \left(2\pi \frac{m}{\lambda_0}\right) \cdot (C_2 \cdot H^2 + C_4 \cdot H^4 + C_6 \cdot H^6 \ldots + C_{2i} \cdot H^{2i}) \quad (a)$$

where "$C_{2i}$" (where "i" is a positive integer) denotes a phase coefficient of a 2i-th order term, "m" denotes the order of diffraction, and "$\lambda_0$" denotes the reference wavelength.

In general, an Abbe number (dispersion value) $\nu_d$ of a refractive optical material, such as a lens or a prism, can be expressed by the following expression:

$$\nu_d = (N_d-1)/(N_F-N_C) > 0 \quad (b)$$

where "$N_d$", "$N_C$", and "$N_F$" denote the refractive power with respect to wavelengths of d-line light, C-line light, and F-line light, respectively. On the other hand, the Abbe number $\nu_d$ of the diffractive optical portion can be expressed by the following expression:

$$\nu_d = \lambda_d/(\lambda_F - \lambda_C) \quad (c)$$

where "$\lambda_d$", "$\lambda_F$", and "$\lambda_C$" denote the wavelengths of d-line light, C-line light, and F-line light, respectively. As a result, $\nu_d = -3.45$. Accordingly, the dispersion at an arbitrary wavelength has an inverse effect of the effect of the refractive optical element.

Based on the above-described expression (a), which expresses the phase of the diffractive optical portion, the refractive power $\phi_D$ of paraxial first-order diffracted light (m=1) at the reference wavelength of the diffractive optical portion can be expressed by the following expression:

$$\phi_D = -2 \times C_2$$

where "$C_2$" denotes the coefficient of the second-order term. Therefore, the focal length fDOE, which is based on only the diffractive component of the diffractive optical element DOE, can be expressed by the following expression:

$$fDOE = \frac{1}{\phi_D} = -\frac{1}{2 \cdot C_2}$$

In addition, the variation of refractive power $\phi_D'$ at an arbitrary wavelength with respect to the refractive power at the reference wavelength can be expressed by the following expression:

$$\phi_D' = (\lambda/\lambda_0) \times (-2 \times C_2) \quad (d)$$

where "$\lambda$" denotes the arbitrary wavelength and "$\lambda_0$" denotes the reference wavelength.

Therefore, as characteristic to the diffractive optical portion, a high dispersion can be achieved by small variation of the paraxial refractive power by variably changing the phase coefficient $C_2$ in the expression (a). In other words, with the diffractive optical portion described above, chromatic aberration can be corrected without so much affecting the efficiency of correcting various aberrations other than chromatic aberration.

Furthermore, the coefficients of the high-order terms including the phase coefficient $C_4$ and subsequent coefficients are set to achieve an effect similar to the effect that can be achieved by providing an aspheric shape due to the variation of the refractive power that occurs according to the variation of the height of the ray incident to the diffractive optical portion. At the same time, the refractive power at the arbitrary wavelength can be varied from the refractive power at the reference wavelength according to the variation of the height of the ray incident to the diffractive optical portion. With the above-described configuration, the photographic optical system according to each exemplary embodiment can effectively correct chromatic aberration of magnification.

In addition, in the first lens unit L1 of the photographic optical system according to each exemplary embodiment of the present invention, the diffractive optical element is provided on the surface through which the axial ray passes at a high location from the optical axis as described above. Therefore, the photographic optical system according to each exemplary embodiment can also effectively correct axial chromatic aberration.

Numerical examples 1 through 7, which respectively correspond to the first through the seventh exemplary embodiments of the present invention, are set forth below. In each of the numerical examples 1 through 7, "i" (where "i" is a positive integer) denotes the order of a surface from the object side, "$r_i$" denotes a radius of curvature of an i-th optical surface (the i-th lens surface), "$d_i$" denotes the space between the i-th surface and the (i+1)-th surface, "$nd_i$" and "$vd_i$" respectively denote a refractive index and an Abbe number of the material of the i-th optical member (lens) with respect to d-line light.

Furthermore, "f", "Fno", and "2ω" denote the focal length, the F-number, and the angle of view (in the unit of degree) of the entire photographic optical system during focusing on an infinitely-distant object. In each numerical example, the last two surfaces from the image side are glass blocks, such as filters. The diffractive optical element (diffractive surface) is represented by using the phase coefficients of the phase function of the above-described expression (a).

In addition, "K" denotes the eccentricity and each of "$A_4$", "$A_6$", "$A_8$", "$A_{10}$", "$A_{12}$", and "$A_{14}$" denotes an aspheric coefficient. When a give surface is an aspherical surface, the surface number is designated by an asterisk (*). The aspheric shape is expressed as $$X = (H^2/R) / \left[1 + \{1 - (1+K)(H/R)^2\}^{1/2}\right] + A_4 \cdot H^4 + A_6 \cdot H^6 + A_8 \cdot H^8 + A_{10} \cdot H^{10} + A_{12} \cdot H^{12} + A_{14} \cdot H^{14}$$

where "X" denotes a displacement from a surface vertex along the optical axis in a position at a height "H" vertically from the optical axis, the numerical value of each term in the expression having a positive sign in the direction of travel of light, and "R" denotes a paraxial radius of curvature. The relationship between each condition described above and each numerical example is set forth in Table 1.

Numerical Example 1 f = 195.20 mm  Fno = 2.05  2ω = 12.64

| Surface No. | r | d | nd | vd | Effective Diameter |
|---|---|---|---|---|---|
| 1* | 78.431 | 18.72 | 1.48749 | 70.2 | 97.93 |
| 2 | 683.902 | 37.00 | | | 96.05 |
| 3* | 64.154 | 16.61 | 1.48749 | 70.2 | 64.12 |
| 4** | −113.235 | 4.00 | 1.67270 | 32.1 | 60.65 |
| 5 | 233.279 | 2.62 | | | 54.89 |
| 6 | ∞ | 4.50 | | | 54.03 |
| 7 | −16393.125 | 2.82 | 1.80809 | 22.8 | 50.21 |
| 8 | −212.349 | 3.00 | 1.72916 | 54.7 | 49.59 |
| 9 | 53.963 | 24.45 | | | 45.11 |
| 10(Stop) | ∞ | 4.44 | | | 41.75 |
| 11* | 119.822 | 2.10 | 1.80809 | 22.8 | 40.68 |
| 12 | 53.559 | 7.44 | 1.77250 | 49.6 | 39.62 |
| 13 | −300.676 | 2.89 | | | 38.88 |
| 14 | 165.882 | 1.75 | 1.69680 | 55.5 | 36.36 |
| 15 | 53.769 | 6.07 | | | 34.84 |
| 16 | −76.729 | 4.85 | 1.84666 | 23.8 | 34.56 |
| 17 | −42.047 | 1.80 | 1.54072 | 47.2 | 34.82 |
| 18 | 84.845 | 3.12 | | | 34.26 |
| 19 | 166.424 | 4.80 | 1.72000 | 43.7 | 35.98 |
| 20 | −86.299 | 2.00 | 1.80809 | 22.8 | 36.65 |
| 21 | −254.890 | 0.20 | | | 37.83 |
| 22 | 68.940 | 5.48 | 1.88300 | 40.8 | 39.91 |
| 23 | 411.403 | 3.40 | | | 39.85 |
| 24 | ∞ | 2.20 | 1.51633 | 64.1 | 40.00 |
| 25 | ∞ | | | | 40.08 |

Aspheric Coefficients

| r1 | k = 3.11694 × 10⁻¹ | A4 = −3.26533 × 10⁻⁸ |
|---|---|---|
| | A6 = −8.42938 × 10⁻¹² | A8 = −5.18825 × 10⁻¹⁵ |
| | A10 = 8.32510 × 10⁻¹⁹ | A12 = −1.76017 × 10⁻²² |
| | A14 = −5.56453 × 10⁻²⁶ | |
| r3 | k = −7.00706 × 10⁻² | A4 = −3.86660 × 10⁻⁷ |
| | A6 = −1.07198 × 10⁻¹⁰ | A8 = −1.24876 × 10⁻¹³ |
| | A10 = 6.07652 × 10⁻¹⁷ | A12 = −5.06077 × 10⁻²⁰ |
| | A14 = 1.17419 × 10⁻²³ | |
| r11 | k = 2.90675 | A4 = 6.77341 × 10⁻⁸ |
| | A6 = −4.58312 × 10⁻¹⁰ | A8 = 2.46195 × 10⁻¹² |
| | A10 = −5.03066 × 10⁻¹⁵ | A12 = 3.45470 × 10⁻¹⁸ |
| | A14 = −5.56453 × 10⁻²⁶ | |

Phase Coefficients for Diffractive Optical Element

| r4 (diffractive surface) | C2 = −1.05100 × 10⁻⁴ |
|---|---|
| C4 = 2.26461 × 10⁻⁸ | C6 = −1.42519 × 10⁻¹¹ |

| | |
|---|---|
| Focal Length | 195.20 |
| F-number | 2.05 |
| Angle of View | 6.32 |
| Image Height | 21.64 |
| Lens Total Length | 227.39 |
| BF (back focus) | 61.13 |
| Entrance Pupil Position | 260.53 |
| Exit Pupil Position | −52.99 |
| Front Principal Point Position | 121.83 |
| Rear Principal Point Position | −134.07 |

Various Data of Each Unit

| Lens unit | First surface | Focal Length | Lens Config. Length | Front Principal Point Position | Rear Principal Point Position |
|---|---|---|---|---|---|
| L1 | 1 | 117.46 | 78.95 | 14.10 | −53.25 |
| L1a | 1 | 179.91 | 18.72 | −1.61 | −14.07 |
| L1b | 3 | 270.37 | 20.61 | −14.90 | −27.01 |
| L2 | 6 | −75.85 | 10.32 | 7.83 | 0.04 |
| L3 | 10 | 120.94 | 52.54 | 32.67 | −8.22 |
| L31 | 10 | 116.71 | 13.98 | 5.95 | −3.89 |
| L32 | 14 | −51.63 | 14.47 | 4.71 | −5.99 |
| L33 | 19 | 58.69 | 18.08 | 2.78 | −9.10 |

Various Data of Each Lens

| Lens unit | First surface | Focal length |
|---|---|---|
| 1 | 1 | 179.91 |
| 2 | 3 | 85.24 |
| 3 | 4 | −115.56 |
| 4 | 7 | 266.20 |
| 5 | 8 | −58.73 |
| 6 | 11 | −121.57 |
| 7 | 12 | 59.39 |
| 8 | 14 | −114.91 |
| 9 | 16 | 103.25 |
| 10 | 17 | −51.74 |
| 11 | 19 | 79.56 |
| 12 | 20 | −162.32 |
| 13 | 22 | 93.09 |
| 14 | 24 | 0.00 |

*Aspheric surface
**Diffractive surface

Numerical Example 2

| f = 293.96 mm Fno = 2.91 2ω = 8.42 | | | | | |
|---|---|---|---|---|---|
| Surface No. | r | d | nd | vd | Effective Diameter |
| 1* | 88.927 | 17.94 | 1.48749 | 70.2 | 101.02 |
| 2 | 1186.415 | 61.14 | | | 99.56 |
| 3* | 86.306 | 11.57 | 1.48749 | 70.2 | 60.86 |
| 4** | −140.848 | 2.80 | 2.00330 | 28.3 | 58.88 |
| 5 | −723.961 | 10.93 | | | 57.12 |
| 6 | −43402.908 | 2.10 | 1.51823 | 58.9 | 48.07 |
| 7 | 52.105 | 34.47 | | | 44.54 |
| 8 (Stop) | ∞ | 8.51 | | | 36.33 |
| 9 | 109.975 | 1.80 | 1.80809 | 22.8 | 33.60 |
| 10 | 41.799 | 7.24 | 1.72916 | 54.7 | 33.37 |
| 11 | −184.309 | 0.95 | | | 33.33 |
| 12 | 148.604 | 4.25 | 1.84666 | 23.8 | 32.91 |
| 13 | −128.209 | 1.65 | 1.59282 | 68.6 | 32.48 |
| 14 | 37.987 | 5.25 | | | 30.92 |
| 15 | −83.062 | 1.60 | 1.83481 | 42.7 | 30.98 |
| 16 | 79.965 | 2.82 | | | 32.05 |
| 17 | ∞ | 0.00 | | | 33.08 |
| 18 | 94.003 | 9.30 | 1.61340 | 44.3 | 34.45 |
| 19 | −36.605 | 2.00 | 1.59282 | 68.6 | 35.50 |
| 20 | −433.023 | 5.02 | | | 37.53 |
| 21 | 85.821 | 6.64 | 1.61340 | 44.3 | 41.33 |
| 22 | −207.224 | 8.00 | | | 41.61 |
| 23 | ∞ | 2.00 | 1.51633 | 64.1 | 41.83 |
| 24 | ∞ | | | | 41.86 |

| Aspheric Coefficients | | |
|---|---|---|
| r1 | $k = -7.42329 \times 10^{-1}$ | $A4 = 1.08216 \times 10^{-7}$ |
| | $A6 = 8.31570 \times 10^{-12}$ | $A8 = -1.01602 \times 10^{-15}$ |
| | $A10 = 1.29395 \times 10^{-18}$ | $A12 = -4.35175 \times 10^{-22}$ |
| | $A14 = 5.59426 \times 10^{-26}$ | |
| r3 | $k = 4.20089$ | $A4 = -1.07710 \times 10^{-6}$ |
| | $A6 = -4.62181 \times 10^{-10}$ | $A8 = 1.46055 \times 10^{-14}$ |
| | $A10 = -5.14653 \times 10^{-16}$ | $A12 = 5.13399 \times 10^{-19}$ |
| | $A14 = -3.05151 \times 10^{-22}$ | |

| Phase Coefficients for Diffractive Optical Element | | |
|---|---|---|
| r4 (diffractive surface) | $C2 = -1.17690 \times 10^{-4}$ | |
| | $C4 = 2.72326 \times 10^{-8}$ | $C6 = -4.52300 \times 10^{-11}$ |
| | $C8 = 4.58985 \times 10^{-14}$ | $C10 = -1.72277 \times 10^{-17}$ |

| | |
|---|---|
| Focal Length | 293.96 |
| F-number | 2.91 |

| f = 293.96 mm Fno = 2.91 2ω = 8.42 | |
|---|---|
| Angle of View | 4.21 |
| Image Height | 21.64 |
| Lens Total Length | 266.78 |
| BF | 58.80 |
| Entrance Pupil Position | 410.57 |
| Exit Pupil Position | −67.55 |
| Front Principal Point Position | 20.66 |
| Rear Principal Point Position | −235.16 |

| Various Data of Each Unit | | | | | |
|---|---|---|---|---|---|
| Lens unit | First surface | Focal length | Lens Config. Length | Front Principal Point Position | Rear Principal Point Position |
| L1 | 1 | 133.93 | 93.45 | 33.82 | −60.83 |
| L1a | 1 | 196.15 | 17.94 | −0.97 | −12.97 |
| L1b | 3 | 270.82 | 14.37 | −3.76 | −12.80 |
| L2 | 6 | −100.42 | 2.10 | 1.38 | −0.00 |
| L3 | 8 | 357.02 | 67.03 | 64.41 | 11.04 |
| L31 | 8 | 107.41 | 17.55 | 10.51 | −3.25 |
| L32 | 12 | −34.88 | 12.75 | 8.33 | −1.21 |
| L33 | 17 | 57.46 | 32.95 | 8.32 | −17.92 |

| Various Data of Each Lens | | |
|---|---|---|
| Lens unit | First surface | Focal length |
| 1 | 1 | 196.15 |
| 2 | 3 | 108.90 |
| 3 | 4 | −182.19 |
| 4 | 6 | −100.42 |
| 5 | 9 | −84.43 |
| 6 | 10 | 47.37 |
| 7 | 12 | 81.87 |
| 8 | 13 | −49.25 |
| 9 | 15 | −48.59 |
| 10 | 18 | 44.15 |
| 11 | 19 | −67.57 |
| 12 | 21 | 99.80 |
| 13 | 23 | 0.00 |

*Aspheric surface
**Diffractive surface

Numerical Example 3

| f = 390.43 mm Fno = 2.90 2ω = 6.34 | | | | | |
|---|---|---|---|---|---|
| Surface No. | r | d | nd | vd | Effective Diameter |
| 1* | 115.822 | 23.04 | 1.48749 | 70.2 | 134.63 |
| 2 | 688.657 | 84.94 | | | 132.52 |
| 3* | 116.272 | 15.84 | 1.49700 | 81.5 | 82.38 |
| 4** | −167.612 | 3.00 | 1.85026 | 32.3 | 80.07 |
| 5 | −4103.131 | 13.51 | | | 77.23 |
| 6 | 317.822 | 5.23 | 1.80809 | 22.8 | 65.93 |
| 7 | −1050.627 | 3.20 | 1.88300 | 40.8 | 64.45 |
| 8* | 89.262 | 85.69 | | | 60.26 |
| 9 (Stop) | ∞ | 11.74 | | | 40.73 |
| 10 | 986.786 | 1.80 | 1.80809 | 22.8 | 37.83 |
| 11 | 50.138 | 8.59 | 1.75700 | 47.8 | 37.05 |
| 12 | −166.862 | 4.62 | | | 36.52 |
| 13 | 89.328 | 6.24 | 1.84666 | 23.9 | 36.54 |
| 14 | −92.356 | 1.70 | 1.60562 | 43.7 | 36.05 |
| 15 | 41.271 | 6.61 | | | 34.04 |
| 16 | −94.722 | 1.80 | 1.80400 | 46.6 | 34.16 |
| 17 | 71.483 | 2.85 | | | 35.34 |
| 18* | 75.721 | 6.78 | 1.73800 | 32.3 | 38.11 |
| 19 | −165.120 | 0.20 | | | 38.90 |

-continued

| f = 390.43 mm Fno = 2.90 2ω = 6.34 | | | | | |
|---|---|---|---|---|---|
| 20 | 60.328 | 3.00 | 1.84666 | 23.9 | 40.08 |
| 21 | 50.612 | 4.26 | 1.61340 | 44.3 | 39.40 |
| 22 | 113.094 | 15.00 | | | 39.20 |
| 23 | ∞ | 2.20 | 1.51633 | 64.1 | 39.95 |
| 24 | ∞ | | | | 40.03 |

| Aspheric Coefficients | | |
|---|---|---|
| r1 | $k = -3.61917 \times 10^{-1}$ | $A4 = 2.45793 \times 10^{-8}$ |
| | $A6 = 1.77214 \times 10^{-12}$ | $A8 = -9.63530 \times 10^{-18}$ |
| | $A10 = 1.40035 \times 10^{-20}$ | |
| r3 | $k = -4.36706$ | $A4 = 2.40172 \times 10^{-7}$ |
| | $A6 = -6.26103 \times 10^{-11}$ | $A8 = 1.19752 \times 10^{-14}$ |
| | $A10 = -3.09581 \times 10^{-18}$ | $A12 = 4.98485 \times 10^{-23}$ |
| r8 | $k = 9.74715 \times 10^{-2}$ | $A4 = 3.89494 \times 10^{-8}$ |
| | $A6 = -3.58095 \times 10^{-11}$ | $A8 = 5.26921 \times 10^{-14}$ |
| | $A10 = -2.23537 \times 10^{-17}$ | |
| r18 | $k = -2.11573 \times 10^{-1}$ | $A4 = -1.55911 \times 10^{-7}$ |
| | $A6 = -1.89445 \times 10^{-10}$ | $A8 = 3.51250 \times 10^{-13}$ |
| | $A10 = -3.79230 \times 10^{-16}$ | |

| Phase Coefficients for Diffractive Optical Element | | |
|---|---|---|
| r4 | $C2 = -4.98533 \times 10^{-5}$ | |
| (diffractive surface) | $C4 = 2.94123 \times 10^{-9}$ | $C6 = -1.15774 \times 10^{-12}$ |

| | |
|---|---|
| Focal Length | 390.43 |
| F-number | 2.90 |
| Angle of View | 3.17 |
| Image Height | 21.64 |
| Lens Total Length | 369.05 |
| BF | 57.21 |
| Entrance Pupil Position | 896.51 |
| Exit Pupil Position | −64.69 |
| Front Principal Point Position | 36.45 |
| Rear Principal Point Position | −333.2 |

Various Data of Each Unit

| Lens unit | First surface | Focal length | Lens Config. Length | Front Principal Point Position | Rear Principal Point Position |
|---|---|---|---|---|---|
| L1 | 1 | 191.14 | 126.82 | 43.78 | −84.29 |
| L1a | 1 | 281.91 | 23.04 | −3.09 | −18.38 |
| L1b | 3 | 391.48 | 18.84 | −7.32 | −19.20 |
| L2 | 6 | −136.87 | 8.43 | 6.25 | 1.58 |
| L3 | 9 | 389.13 | 77.39 | 20.69 | −42.84 |
| L31 | 9 | 230.52 | 22.13 | 17.67 | 0.04 |
| L32 | 13 | −47.07 | 16.35 | 13.85 | 1.00 |
| L33 | 18 | 53.57 | 31.44 | 0.28 | −24.32 |

Various Data of Each Lens

| Lens unit | First surface | Focal length |
|---|---|---|
| 1 | 1 | 281.91 |
| 2 | 3 | 138.87 |
| 3 | 4 | −209.90 |
| 4 | 6 | 302.47 |
| 5 | 7 | −93.05 |
| 6 | 10 | −65.42 |
| 7 | 11 | 51.81 |
| 8 | 13 | 54.49 |
| 9 | 14 | −46.87 |
| 10 | 16 | −50.43 |
| 11 | 18 | 71.20 |
| 12 | 20 | −432.37 |
| 13 | 21 | 145.58 |
| 14 | 23 | 0.00 |

*Aspheric surface
**Diffractive surface

Numerical Example 4

| f = 584.93 mm Fno = 4.12 2ω = 4.24 | | | | | |
|---|---|---|---|---|---|
| Surface No. | r | d | nd | vd | Effective Diameter |
| 1* | 135.384 | 25.06 | 1.48749 | 70.2 | 141.97 |
| 2** | −706.456 | 5.80 | 1.80000 | 29.8 | 141.22 |
| 3 | −1368.830 | 130.00 | | | 139.22 |
| 4* | 135.666 | 7.00 | 1.43387 | 95.1 | 60.86 |
| 5 | −194.646 | 5.00 | 1.74950 | 35.3 | 60.15 |
| 6 | 454.876 | 26.05 | | | 57.12 |
| 7 | 2544.378 | 2.00 | 1.80809 | 22.8 | 43.04 |
| 8 | −2797.798 | 3.30 | 1.88300 | 40.8 | 42.47 |
| 9 | 126.559 | 49.00 | | | 40.98 |
| 10 (Stop) | ∞ | 7.01 | | | 28.36 |
| 11 | 240.831 | 2.00 | 1.84666 | 23.8 | 26.39 |
| 12 | 35.958 | 6.25 | 1.61340 | 44.3 | 25.61 |
| 13 | −95.144 | 1.98 | | | 25.26 |
| 14 | −208.365 | 1.95 | 1.84666 | 23.8 | 24.53 |
| 15 | −98.117 | 1.65 | 1.60311 | 60.6 | 24.68 |
| 16 | 56.274 | 3.31 | | | 24.97 |
| 17 | −106.364 | 1.60 | 1.80400 | 46.6 | 25.44 |
| 18 | 225.560 | 3.55 | | | 26.36 |
| 19 | 91.800 | 3.89 | 1.61340 | 44.3 | 29.59 |
| 20 | −190.340 | 13.33 | | | 30.22 |
| 21 | 186.530 | 2.00 | 1.74950 | 35.3 | 35.98 |
| 22 | 108.521 | 4.00 | 1.80809 | 22.8 | 36.34 |
| 23 | −205.026 | 12.00 | | | 36.53 |
| 24 | ∞ | 2.00 | 1.51633 | 64.1 | 45.00 |
| 25 | ∞ | | | | 45.00 |

| Aspheric Coefficients | |
|---|---|
| r1 | k = 2.61200 × 10⁻¹    A4 = −3.21156 × 10⁻⁸ |
| | A6 = −1.77315 × 10⁻¹²    A8 = −5.84324 × 10⁻¹⁷ |
| | A10 = −1.28282 × 10⁻²⁰    A12 = 9.26465 × 10⁻²⁵ |
| | A14 = −8.46983 × 10⁻²⁹ |
| r4 | k = 2.50912    A4 = −2.59429 × 10⁻⁷ |
| | A6 = −2.33712 × 10⁻¹¹    A8 = −3.16046 × 10⁻¹⁴ |
| | A10 = 3.49986 × 10⁻¹⁷    A12 = −1.59925 × 10⁻²⁰ |
| | A14 = 1.34624 × 10⁻²⁴ |

Phase Coefficients for Diffractive Optical Element r2 (diffractive surface): $C2 = -2.05427 \times 10^{-5}$, $C4 = 3.51912 \times 10^{-10}$, $C6 = -1.61132 \times 10^{-14}$, $C8 = 3.48003 \times 10^{-18}$, $C10 = -3.22948 \times 10^{-22}$

| | |
|---|---|
| Focal Length | 584.93 |
| F-number | 4.12 |
| Angle of View | 2.12 |
| Image Height | 21.64 |
| Lens Total Length | 401.79 |
| BF | 82.07 |
| Entrance Pupil Position | 1492.32 |
| Exit Pupil Position | −77.71 |
| Front Principal Point Position | −64.14 |
| Rear Principal Point Position | −502.86 |

Various Data of Each Unit

| Lens unit | First surface | Focal length | Lens Config. Length | Front Principal Point Position | Rear Principal Point Position |
|---|---|---|---|---|---|
| L1 | 1 | 260.47 | 172.86 | −4.56 | −155.98 |
| L1a | 1 | 265.48 | 30.86 | 1.32 | −18.87 |
| L1b | 4 | −79126.10 | 12.00 | 1638.44 | 1597.60 |
| L2 | 7 | −149.70 | 5.30 | 2.99 | 0.13 |
| L3 | 10 | 579.90 | 66.51 | 162.52 | 148.08 |
| L31 | 10 | 281.74 | 15.26 | 14.09 | 2.15 |
| L32 | 14 | −41.57 | 8.50 | 3.48 | −2.69 |
| L33 | 19 | 59.13 | 37.22 | 9.07 | −24.73 |

Various Data of Each Lens

| Lens unit | First surface | Focal length |
|---|---|---|
| 1 | 1 | 233.23 |
| 2 | 2 | −1980.86 |
| 3 | 4 | 185.45 |
| 4 | 5 | −181.28 |
| 5 | 7 | 1649.26 |
| 6 | 8 | −137.05 |
| 7 | 11 | −50.15 |
| 8 | 12 | 43.33 |
| 9 | 14 | 217.26 |
| 10 | 15 | −59.06 |
| 11 | 17 | −89.71 |
| 12 | 19 | 101.49 |
| 13 | 21 | −350.06 |
| 14 | 22 | 88.32 |
| 15 | 24 | 0.00 |

*Aspheric surface
**Diffractive surface

Numerical Example 5

| f = 390.10 mm Fno = 2.90 2ω = 6.34 | | | | | |
|---|---|---|---|---|---|
| Surface No. | r | d | nd | vd | Effective Diameter |
| 1* | 133.425 | 24.63 | 1.48749 | 70.2 | 134.52 |
| 2** | −1508.501 | 5.50 | 1.60342 | 38.0 | 132.69 |
| 3 | −21178.745 | 78.90 | | | 130.38 |
| 4* | 104.704 | 17.75 | 1.49700 | 81.5 | 81.90 |
| 5 | −139.477 | 3.00 | 1.61340 | 44.3 | 79.39 |
| 6 | 141.171 | 16.41 | | | 72.33 |
| 7 | 413.100 | 3.27 | 1.80809 | 22.8 | 65.56 |
| 8 | 19398.784 | 3.20 | 1.88300 | 40.8 | 64.85 |
| 9* | 151.131 | 87.80 | | | 62.64 |
| 10 (Stop) | ∞ | 4.02 | | | 40.50 |
| 11 | 120.225 | 2.18 | 1.84666 | 23.8 | 39.03 |
| 12 | 50.399 | 8.53 | 1.65160 | 58.5 | 37.78 |
| 13 | −196.061 | 9.51 | | | 36.85 |
| 14 | 122.401 | 5.28 | 1.84666 | 23.8 | 33.08 |
| 15 | −83.172 | 1.90 | 1.72000 | 50.2 | 32.67 |
| 16 | 51.793 | 3.21 | | | 31.45 |
| 17 | −219.982 | 1.67 | 1.88300 | 40.8 | 31.47 |
| 18 | 62.616 | 4.63 | | | 32.00 |
| 19 | 104.534 | 3.62 | 1.74950 | 35.3 | 35.19 |
| 20 | −1418.268 | 6.20 | | | 35.72 |
| 21* | 63.857 | 6.95 | 1.77250 | 49.6 | 40.00 |
| 22 | −265.964 | 1.87 | 1.54814 | 45.8 | 39.86 |
| 23 | 128.501 | 3.00 | | | 39.56 |
| 24 | ∞ | 2.20 | 1.48749 | 70.2 | 39.64 |
| 25 | ∞ | | | | 39.72 |

Aspheric Coefficients r1: $k = 1.69585 \times 10^{-1}$, $A4 = -7.15187 \times 10^{-9}$, $A6 = -2.82795 \times 10^{-13}$, $A8 = -1.85228 \times 10^{-16}$, $A10 = 4.30052 \times 10^{-21}$, $A12 = 2.82371 \times 10^{-24}$, $A14 = -3.72223 \times 10^{-28}$ r4: $k = 2.60765 \times 10^{-3}$, $A4 = -9.39197 \times 10^{-8}$, $A6 = -2.13547 \times 10^{-11}$, $A8 = 2.17446 \times 10^{-16}$, $A10 = 4.89125 \times 10^{-18}$, $A12 = -3.55012 \times 10^{-21}$, $A14 = 7.10652 \times 10^{-25}$ r9: $k = 2.16633$, $A4 = -4.85657 \times 10^{-8}$, $A6 = -1.20783 \times 10^{-11}$, $A8 = -3.04459 \times 10^{-15}$, $A10 = 3.29034 \times 10^{-17}$, $A12 = -3.80144 \times 10^{-20}$, $A14 = 1.32879 \times 10^{-23}$ r21: $k = -6.65834 \times 10^{-1}$, $A4 = 2.08542 \times 10^{-7}$, $A6 = 6.71257 \times 10^{-10}$, $A8 = -5.56397 \times 10^{-12}$ -continued

| f = 390.10 mm Fno = 2.90 2ω = 6.34 | | |
|---|---|---|
| A10 = 2.13048 × 10$^{-14}$ | A12 = -3.73667 × 10$^{-17}$ | |
| A14 = 2.46283 × 10$^{-20}$ | | |
| Phase Coefficients for Diffractive Optical Element | | |
| r2 | C2 = -1.51480 × 10$^{-5}$ | |
| (diffractive surface) | C4 = 2.92997 × 10$^{-10}$ | C6 = -2.41768 × 10$^{-15}$ |

| | |
|---|---|
| Focal Length | 390.10 |
| F-number | 2.90 |
| Angle of View | 3.17 |
| Image Height | 21.64 |
| Lens Total Length | 368.99 |
| BF | 63.77 |
| Entrance Pupil Position | 909.32 |
| Exit Pupil Position | -56.95 |
| Front Principal Point Position | 38.82 |
| Rear Principal Point Position | -326.33 |

Various Data of Each Unit

| Lens unit | First surface | Focal length | Lens Config. Length | Front Principal Point Position | Rear Principal Point Position |
|---|---|---|---|---|---|
| L1 | 1 | 261.84 | 129.77 | -21.10 | -117.94 |
| L1a | 1 | 275.00 | 30.13 | -0.06 | -20.04 |
| L1b | 4 | -9135.72 | 20.75 | 635.46 | 581.30 |
| L2 | 7 | -260.25 | 6.47 | 5.33 | 1.79 |
| L3 | 10 | 449.65 | 64.77 | 25.08 | -30.38 |
| L31 | 10 | 155.16 | 14.73 | 6.60 | -3.86 |
| L32 | 14 | -43.32 | 12.06 | 8.53 | 0.20 |
| L33 | 19 | 61.80 | 23.84 | 3.47 | -14.43 |

Various Data of Each Lens

| Lens unit | First surface | Focal length |
|---|---|---|
| 1 | 1 | 250.89 |
| 2 | 2 | -2930.93 |
| 3 | 4 | 123.31 |
| 4 | 5 | -113.92 |
| 5 | 7 | 522.28 |
| 6 | 8 | -172.51 |
| 7 | 11 | -103.98 |
| 8 | 12 | 62.38 |
| 9 | 14 | 59.19 |
| 10 | 15 | -44.07 |
| 11 | 17 | -55.05 |
| 12 | 19 | 130.03 |
| 13 | 21 | 67.28 |
| 14 | 22 | -157.80 |
| 15 | 24 | 0.00 |

*Aspheric surface
**Diffractive surface

Numerical Example 6

| f = 293.49 mm Fno = 2.91 2ω = 8.44 | | | | | |
|---|---|---|---|---|---|
| Surface No. | r | d | nd | vd | Effective Diameter |
| 1* | 81.481 | 18.06 | 1.48749 | 70.2 | 100.86 |
| 2 | 588.561 | 66.87 | | | 99.48 |
| 3* | -1440.618 | 2.80 | 2.00330 | 28.3 | 58.94 |
| 4** | 182.561 | 4.99 | 1.51742 | 52.4 | 57.60 |
| 5 | -2033.809 | 30.05 | | | 57.06 |
| 6* | 86.814 | 5.00 | 1.51742 | 52.4 | 45.48 |
| 7 | 233.323 | 11.06 | | | 44.23 |
| 8 (Stop) | ∞ | 8.51 | | | 38.84 |
| 9 | 440.225 | 1.80 | 1.84666 | 23.8 | 34.09 |
| 10 | 36.891 | 6.95 | 1.72000 | 50.2 | 33.24 |
| 11 | -198.672 | 0.95 | | | 33.20 |
| 12 | 191.578 | 4.25 | 1.84666 | 23.8 | 32.84 |
| 13 | -64.646 | 1.65 | 1.60311 | 60.6 | 32.61 |
| 14 | 42.739 | 6.32 | | | 30.82 |
| 15 | -50.099 | 1.60 | 1.77250 | 49.6 | 30.85 |
| 16 | 103.354 | 2.82 | | | 32.40 |
| 17 | ∞ | 7.04 | | | 33.71 |
| 18 | 127.502 | 9.30 | 1.61340 | 44.3 | 41.06 |
| 19 | -51.101 | 2.00 | 1.59282 | 68.6 | 42.15 |
| 20 | -103.589 | 2.00 | | | 43.61 |
| 21* | 161.463 | 5.00 | 1.61340 | 44.3 | 45.36 |
| 22 | -181.756 | 8.00 | | | 45.51 |
| 23 | ∞ | 2.00 | 1.51633 | 64.1 | 45.23 |
| 24 | ∞ | | | | 45.19 |

Aspheric Coefficients

| | | | |
|---|---|---|---|
| r1 | k = -1.44299 | A4 = 3.11191 × 10$^{-7}$ | |
| | A6 = 7.16264 × 10$^{-12}$ | A8 = 6.26100 × 10$^{-15}$ | |
| | A10 = -2.26475 × 10$^{-18}$ | A12 = 5.67202 × 10$^{-22}$ | |
| | A14 = -4.70118 × 10$^{-26}$ | | |
| r3 | k = 9.06066 × 10$^{2}$ | A4 = -3.62723 × 10$^{-7}$ | |
| | A6 = 7.34584 × 10$^{-11}$ | A8 = -3.05870 × 10$^{-13}$ | |
| | A10 = 4.45187 × 10$^{-16}$ | A12 = -3.25205 × 10$^{-19}$ | |
| | A14 = 9.90121 × 10$^{-23}$ | | |
| r6 | k = 4.29206 | A4 = -7.29665 × 10$^{-7}$ | |
| | A6 = -2.49292 × 10$^{-10}$ | A8 = -3.54999 × 10$^{-13}$ | |
| r21 | k = 1.00536 × 10$^{-1}$ | A4 = -4.23290 × 10$^{-7}$ | |
| | A6 = -6.97320 × 10$^{-11}$ | A8 = -5.10808 × 10$^{-14}$ | |

Phase Coefficients for Diffractive Optical Element

| r4 | C2 = -9.46831 × 10$^{-5}$ | |
|---|---|---|
| (diffractive surface) | C4 = -1.79365 × 10$^{-8}$ | C6 = 5.20740 × 10$^{-11}$ |
| | C8 = -1.01184 × 10$^{-13}$ | C10 = 5.30470 × 10$^{-17}$ |

| | |
|---|---|
| Focal Length | 293.49 |
| F-number | 2.91 |
| Angle of View | 4.22 |
| Image Height | 21.64 |
| Lens Total Length | 271.90 |
| BF | 62.89 |
| Entrance Pupil Position | 354.74 |
| Exit Pupil Position | -87.34 |
| Front Principal Point Position | 74.84 |
| Rear Principal Point Position | -230.61 |

Various Data of Each Unit

| Lens unit | First surface | Focal length | Lens Config. Length | Front Principal Point Position | Rear Principal Point Position |
|---|---|---|---|---|---|
| L1 | 1 | 282.44 | 92.72 | -69.06 | -124.06 |
| L1a | 1 | 191.76 | 18.06 | -1.93 | -13.93 |
| L1b | 3 | -343.21 | 7.79 | 0.78 | -3.92 |
| L2 | 6 | 264.13 | 5.00 | -1.93 | -5.19 |
| L3 | 8 | -799.72 | 70.18 | -213.31 | -378.24 |
| L31 | 8 | 468.28 | 17.26 | 15.47 | 1.97 |
| L32 | 12 | -34.32 | 13.82 | 9.35 | -1.26 |
| L33 | 17 | 57.62 | 35.33 | 13.73 | -15.08 |

Various Data of Each Lens

| Lens unit | First surface | Focal length |
|---|---|---|
| 1 | 1 | 191.76 |
| 2 | 3 | -166.45 |
| 3 | 4 | 305.30 |
| 4 | 6 | 264.13 |
| 5 | 9 | -47.66 |

-continued f = 293.49 mm Fno = 2.91 2ω = 8.44

| | | |
|---|---|---|
| 6 | 10 | 43.75 |
| 7 | 12 | 57.53 |
| 8 | 13 | −42.42 |
| 9 | 15 | −43.48 |
| 10 | 18 | 60.67 |
| 11 | 19 | −172.57 |
| 12 | 21 | 140.17 |
| 13 | 23 | 0.00 |

*Aspheric surface
**Diffractive surface

Numerical Example 7 f = 295.63 mm Fno = 2.91 2ω = 8.38

| Surface No. | r | d | nd | vd | Effective Diameter |
|---|---|---|---|---|---|
| 1* | 91.224 | 16.37 | 1.48749 | 70.2 | 101.59 |
| 2** | 539.442 | 3.00 | 1.48749 | 70.2 | 100.18 |
| 3 | 1510.420 | 61.14 | | | 99.57 |
| 4* | 79.429 | 11.97 | 1.48749 | 70.2 | 60.27 |
| 5 | −140.753 | 2.80 | 2.00330 | 28.3 | 58.18 |
| 6 | −962.892 | 9.62 | | | 56.33 |
| 7 | 2775.681 | 2.10 | 1.61405 | 55.0 | 48.28 |
| 8 | 60.306 | 34.47 | | | 45.23 |
| 9 (Stop) | ∞ | 8.51 | | | 36.75 |
| 10 | 106.493 | 1.80 | 1.80809 | 22.8 | 33.97 |
| 11 | 43.439 | 7.06 | 1.72916 | 54.7 | 33.48 |
| 12 | −200.400 | 0.95 | | | 33.40 |
| 13 | 121.737 | 4.25 | 1.84666 | 23.8 | 32.94 |
| 14 | −107.314 | 1.65 | 1.59282 | 68.6 | 32.53 |
| 15 | 38.403 | 5.01 | | | 30.69 |
| 16 | −89.761 | 1.60 | 1.83481 | 42.7 | 30.71 |
| 17 | 62.487 | 2.82 | | | 31.55 |
| 18 | ∞ | 0.00 | | | 32.24 |
| 19 | 92.835 | 9.30 | 1.61340 | 44.3 | 33.55 |
| 20 | −34.920 | 2.00 | 1.59282 | 68.6 | 34.63 |
| 21 | −191.348 | 5.03 | | | 36.52 |
| 22 | 57.939 | 6.52 | 1.48749 | 70.2 | 40.48 |
| 23 | 1287.265 | 8.00 | | | 40.53 |
| 24 | ∞ | 2.00 | 1.51633 | 64.1 | 40.87 |
| 25 | ∞ | | | | 40.92 |

Aspheric Coefficients

| | |
|---|---|
| r1 | k = −6.14463 × 10⁻¹   A4 = 8.54185 × 10⁻⁸ |
| | A6 = 4.32621 × 10⁻¹²   A8 = −6.67336 × 10⁻¹⁶ |
| | A10 = 1.36227 × 10⁻¹⁸   A12 = −4.55872 × 10⁻²² |
| | A14 = 5.37448 × 10⁻²⁶ |
| r4 | κ = 3.51567   A4 = −1.11556 × 10⁻⁶ |
| | A6 = −4.53864 × 10⁻¹⁰   A8 = −2.42878 × 10⁻¹⁴ |
| | A10 = −5.86338 × 10⁻¹⁶   A12 = 6.00795 × 10⁻¹⁹ |
| | A14 = −3.70400 × 10⁻²² |

Phase Coefficients for Diffractive Optical Element

| | |
|---|---|
| r2 (diffractive surface) | C2 = −4.00052 × 10⁻⁵ |
| | C4 = 2.98192 × 10⁻⁹   C6 = −1.82246 × 10⁻¹² |
| | C8 = 7.12777 × 10⁻¹⁶   C10 = −9.91647 × 10⁻²⁰ |

| | |
|---|---|
| Focal Length | 295.63 |
| F-number | 2.91 |
| Angle of View | 4.19 |
| Image Height | 21.64 |
| Lens Total Length | 264.00 |
| BF | 56.02 |
| Entrance Pupil Position | 409.13 |
| Exit Pupil Position | −62.62 |
| Front Principal Point Position | −31.89 |
| Rear Principal Point Position | −239.61 | f = 295.63 mm Fno = 2.91 2ω = 8.38

Various Data of Each Unit

| Lens unit | First surface | Focal length | Lens Config. Length | Front Principal Point Position | Rear Principal Point Position |
|---|---|---|---|---|---|
| L1 | 1 | 133.93 | 95.28 | 33.18 | −62.15 |
| L1a | 1 | 195.35 | 19.37 | −0.65 | −13.62 |
| L1b | 4 | 274.69 | 14.77 | −5.39 | −14.59 |
| L2 | 7 | −100.42 | 2.10 | 1.33 | 0.03 |
| L3 | 9 | 443.81 | 66.51 | 53.69 | −1.54 |
| L31 | 9 | 107.41 | 17.36 | 10.30 | −3.35 |
| L32 | 13 | −34.88 | 12.51 | 8.84 | −0.57 |
| L33 | 18 | 57.46 | 32.85 | 6.86 | −19.41 |

Various Data of Each Lens

| Lens unit | First surface | Focal length |
|---|---|---|
| 1 | 1 | 218.88 |
| 2 | 2 | 1511.50 |
| 3 | 4 | 106.05 |
| 4 | 5 | −164.59 |
| 5 | 7 | −100.42 |
| 6 | 10 | −91.96 |
| 7 | 11 | 49.57 |
| 8 | 13 | 67.94 |
| 9 | 14 | −47.51 |
| 10 | 16 | −43.92 |
| 11 | 19 | 42.55 |
| 12 | 20 | −72.40 |
| 13 | 22 | 124.24 |
| 14 | 24 | 0.00 |

*Aspheric surface
**Diffractive surface

TABLE 1

| Con- dition | Numerical Example | | | | | | |
|---|---|---|---|---|---|---|---|
| | 1 | 2 | 3 | 4 | 5 | 6 | 7 |
| (1) | 0.0794 | 0.0788 | 0.0794 | 0.0785 | 0.0737 | 0.0845 | 0.0796 |
| (2) | 0.665 | 0.724 | 0.720 | −0.003 | −0.030 | −0.559 | 0.711 |
| (3) | 24.4 | 14.5 | 25.9 | 41.6 | 84.6 | 18.0 | 42.3 |
| (4) | 0.529 | 0.515 | 0.478 | 0.535 | 0.489 | 0.526 | 0.520 |
| (5) | 0.0604 | 0.0488 | 0.0509 | 0.0529 | 0.0664 | 0.1153 | 0.0487 |
| (6) | 1.55 | 1.33 | 1.40 | 1.74 | 1.01 | 1.07 | 1.33 |
| (7) | 0.63 | 0.28 | 0.35 | 0.26 | 0.58 | 0.33 | 0.23 |
| (8) | 0.39 | 0.34 | 0.35 | 0.26 | 0.67 | 0.90 | 0.34 |
| (9) | 0.62 | 1.21 | 1.00 | 0.99 | 1.15 | 2.72 | 1.50 |
| (10) | 0.60 | 0.37 | 0.59 | 0.48 | 0.40 | 1.60 | 0.36 |
| (11) | −0.26 | −0.12 | −0.12 | −0.07 | −0.11 | −0.12 | −0.12 |
| (12) | 0.30 | 0.20 | 0.14 | 0.10 | 0.16 | 0.20 | 0.19 |

Next, an exemplary embodiment of an image pickup apparatus (e.g., a camera system) that uses the photographic optical system according to each exemplary embodiment of the present invention will be described below with reference to FIG. 8. FIG. 8 illustrates main components of a single-lens reflex camera as an example of an image pickup apparatus according to an exemplary embodiment of the present invention.

Referring to FIG. 8, a photographic lens 10 includes a photographic optical system 1, which is constituted by any of the above-described first through the seventh exemplary embodiments. The photographic optical system 1 is supported by a lens barrel 2, which is a supporting member.

A camera body 20 includes a quick return mirror 3, a focusing screen 4, and a pentagonal roof prism 5. The quick return mirror 3 reflects a light flux from the photographic lens 10 upwards. The focusing screen 4 is provided at the image forming position for the photographic lens 10. The pentagonal roof prism 5 converts a reverse image formed on the focusing screen 4 into an erect image. In addition, the camera body 10 includes an eyepiece lens 6, via which a user of the camera can observe the erect image. An image sensor (photoelectrical conversion element), such as a solid-state CCD sensor or a CMOS sensor, or a silver-halide film, is provided as a photosensitive surface 7 located at the image plane of the photographic optical system 1. During shooting, the quick return mirror 3 retracts from the optical path and the photographic lens 10 forms an image on the photosensitive surface 7.

By applying the photographic optical system according to each of the first through the seventh exemplary embodiments to an image pickup apparatus, such as a film camera, a video camera, or a digital still camera, the present invention can implement a lightweight image pickup apparatus having a high optical performance.

While the present invention has been described with reference to exemplary embodiments, it is to be understood that the invention is not limited to the disclosed exemplary embodiments. For example, certain embodiments of the present invention have been discussed as being related to a photographic optical system useful in an image pickup apparatus, such as a video camera, a digital still camera, a television (TV) camera, or a monitoring camera. However, the photographic optical system may also be useful in other image pickup apparatuses or image display apparatuses, such as an optical projector, or the like. Thus, the scope of the following claims is to be accorded the broadest interpretation so as to encompass all modifications, equivalent structures, and functions.

This application claims priority from Japanese Patent Application No. 2010-137237 filed Jun. 16, 2010, which is hereby incorporated by reference herein in its entirety.

What is claimed is:

1. A photographic optical system having a plurality of lens units, in order from an object side to an image side and arranged along an optical axis thereof, comprising:
    a first lens unit having a positive refractive power;
    a second lens unit having a positive or negative refractive power; and
    a third lens unit having a positive or negative refractive power,
    wherein the first lens unit consists of a first lens sub-unit having a positive refractive power and a second lens sub-unit having a positive or negative refractive power with a largest air space provided therebetween,
    wherein the first lens unit further includes a diffractive optical element and an aspheric surface,
    wherein the second lens unit is configured to move along the optical axis to effect focusing, and
    wherein, when L is a length on the optical axis from a lens surface furthest on the object side of the first lens sub-unit to an image plane of the entire photographic optical system, $d1ab$ is an air space between the first lens sub-unit and the second lens sub-unit, $f1a$ is a focal length of the first lens sub-unit, $f1b$ is a focal length of the second lens sub-unit, fDOE is a focal length of the diffractive optical element by only a diffractive component, f is a focal length of the entire photographic optical system, and Fno is an F-number of the entire photographic optical system during focusing on an infinitely-distant object, the following conditions are satisfied:

$$0.0500 < d1ab/(L \times Fno) < 0.2000$$

$$-1.000 < f1a/f1b < 1.000$$

$$5.0 < fDOE/f < 200.0.$$

2. The photographic optical system according to claim 1, wherein, when f is the focal length of the entire photographic optical system, $f1a$ is the focal length of the first lens sub-unit, Fno is the F-number of the entire photographic optical system during focusing on an infinitely-distant object, f1 is a focal length of the first lens unit, and $d1ab$ is the air space between the first lens sub-unit and the second lens sub-unit, the following conditions are further satisfied:

$$0.460 < f/(f1a \times Fno) < 1.000$$

$$0.0430 < ((f1/f1a) \times d1ab)/(f \times Fno) < 0.3000.$$

3. The photographic optical system according to claim 1, wherein, when f1 is a focal length of the first lens unit and f2 is a focal length of the second lens unit, the following condition is further satisfied:

$$0.50 < |f1/f2| < 2.20.$$

4. The photographic optical system according to claim 1, wherein, when f2 is a focal length of the second lens unit and f3 is a focal length of the third lens unit, the following condition is further satisfied:

$$0.10 < |f2/f3| < 1.00.$$

5. The photographic optical system according to claim 1, wherein, when f2 is a focal length of the second lens unit, f3 is a focal length of the third lens unit, and f is the focal length of the entire photographic optical system, the following conditions are further satisfied:

$$0.10 < |f2/f1| < 2.00$$

$$0.30 < |f3/f1| < 10.00.$$

6. The photographic optical system according to claim 1, wherein the first lens sub-unit includes one positive lens or two lenses, and
    wherein the second lens sub-unit includes one positive lens and one negative lens.

7. The photographic optical system according to claim 1, further comprising an aperture stop located between the second lens unit and the third lens unit.

8. The photographic optical system according to claim 1, wherein a diffractive optical portion of the diffractive optical element is formed on a cemented surface between two lenses.

9. The photographic optical system according to claim 1, wherein a composite refractive power of the first lens unit and the second lens unit is positive,
    wherein the third lens unit includes a first lens sub-unit having a positive refractive power, a second lens sub-unit having a negative refractive power, and a third lens sub-unit having a positive refractive power, and
    wherein the second lens sub-unit of the third lens unit is configured to move in directions perpendicular to the optical axis to vary a position of formation of an image to be photographed.

10. The photographic optical system according to claim 9, wherein, when f31 is a focal length of the first lens sub-unit of the third lens unit, f32 is a focal length of the second lens sub-unit of the third lens unit, f33 is a focal length of the third lens sub-unit of the third lens unit, and f is the focal length of the entire photographic optical system, the following conditions are further satisfied:

$0.10 < f31/f < 3.00$ $-0.50 < f32/f < -0.05$ $0.05 < f33/f < 0.50$.

11. An image pickup apparatus comprising:
a photographic optical system; and
an image sensor or a film surface configured to receive an image formed by the photographic optical system,
the photographic optical system having a plurality of lens units, in order from an object side to an image side and arranged along an optical axis thereof, comprising:
a first lens unit having a positive refractive power;
a second lens unit having a positive or negative refractive power; and
a third lens unit having a positive or negative refractive power,
wherein the first lens unit consists of a first lens sub-unit having a positive refractive power and a second lens sub-unit having a positive or negative refractive power with a largest air space provided therebetween,
wherein the first lens unit further includes a diffractive optical element and an aspheric surface,
wherein the second lens unit is configured to move along the optical axis to effect focusing, and
wherein, when L is a length on the optical axis from a lens surface furthest on the object side of the first lens sub-unit to an image plane of the entire photographic optical system, d1$ab$ is an air space between the first lens sub-unit and the second lens sub-unit, f1$a$ is a focal length of the first lens sub-unit, f1$b$ is a focal length of the second lens sub-unit, fDOE is a focal length of the diffractive optical element by only a diffractive component, f is a focal length of the entire photographic optical system, and Fno is an F-number of the entire photographic optical system during focusing on an infinitely-distant object, the following conditions are satisfied:

$0.0500 < d1ab/(L \times Fno) < 0.2000$ $-1.000 < f1a/f1b < 1.000$ $5.0 < fDOE/f < 200.0$.

* * * * *